United States Patent
Mashitani et al.

(10) Patent No.: US 10,158,848 B2
(45) Date of Patent: Dec. 18, 2018

(54) PROJECTION VIDEO DISPLAY

(71) Applicant: Panasonic Intellectual Property Management Co., Ltd., Osaka (JP)

(72) Inventors: Ken Mashitani, Osaka (JP); Takaaki Abe, Osaka (JP); Tamotsu Akeyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 95 days.

(21) Appl. No.: 15/284,062

(22) Filed: Oct. 3, 2016

(65) Prior Publication Data

US 2017/0099484 A1    Apr. 6, 2017

(30) Foreign Application Priority Data

Oct. 5, 2015 (JP) .................. 2015-197267

(51) Int. Cl.
| | |
|---|---|
| *H04N 13/363* | (2018.01) |
| *H04N 13/339* | (2018.01) |
| *H04N 13/354* | (2018.01) |
| *H04N 13/359* | (2018.01) |
| *H04N 13/398* | (2018.01) |
| *G03B 21/14* | (2006.01) |
| *G03B 35/16* | (2006.01) |
| *H04N 9/31* | (2006.01) |
| *H04N 13/341* | (2018.01) |

(52) U.S. Cl.
CPC ......... *H04N 13/363* (2018.05); *G03B 21/142* (2013.01); *G03B 35/16* (2013.01); *H04N 9/317* (2013.01); *H04N 9/3188* (2013.01); *H04N 13/339* (2018.05); *H04N 13/341* (2018.05); *H04N 13/354* (2018.05); *H04N 13/359* (2018.05); *H04N 13/398* (2018.05); *G03B 2205/0061* (2013.01)

(58) Field of Classification Search
CPC ........................................ H04N 13/00
USPC ....................................... 348/51–60
See application file for complete search history.

(56) References Cited

U.S. PATENT DOCUMENTS

| | | | |
|---|---|---|---|
| 2006/0023003 A1 | 2/2006 | Yamanaka | |
| 2013/0265622 A1* | 10/2013 | Christmas | ......... G02B 27/0103 359/9 |
| 2014/0340492 A1 | 11/2014 | Abe et al. | |

FOREIGN PATENT DOCUMENTS

| | | |
|---|---|---|
| JP | 2006-047414 A | 2/2006 |
| JP | 2015-005974 A | 1/2015 |

* cited by examiner

*Primary Examiner* — Anand S Rao
(74) *Attorney, Agent, or Firm* — McDermott Will & Emery LLP

(57) ABSTRACT

A projection video display that projects video image suppresses deterioration of its quality which is attributed to a change in an optical path of the video image. A video signal generator performs control such that a second subframe in an N-th frame in a left-eye image is displayed on DMDs and then a second subframe in an N-th frame in a right-eye image is displayed on the DMDs. Furthermore, the video signal generator performs control such that a displayed location is not changed on a screen and the same types of subframes are displayed at the time when frames are switched.

10 Claims, 25 Drawing Sheets

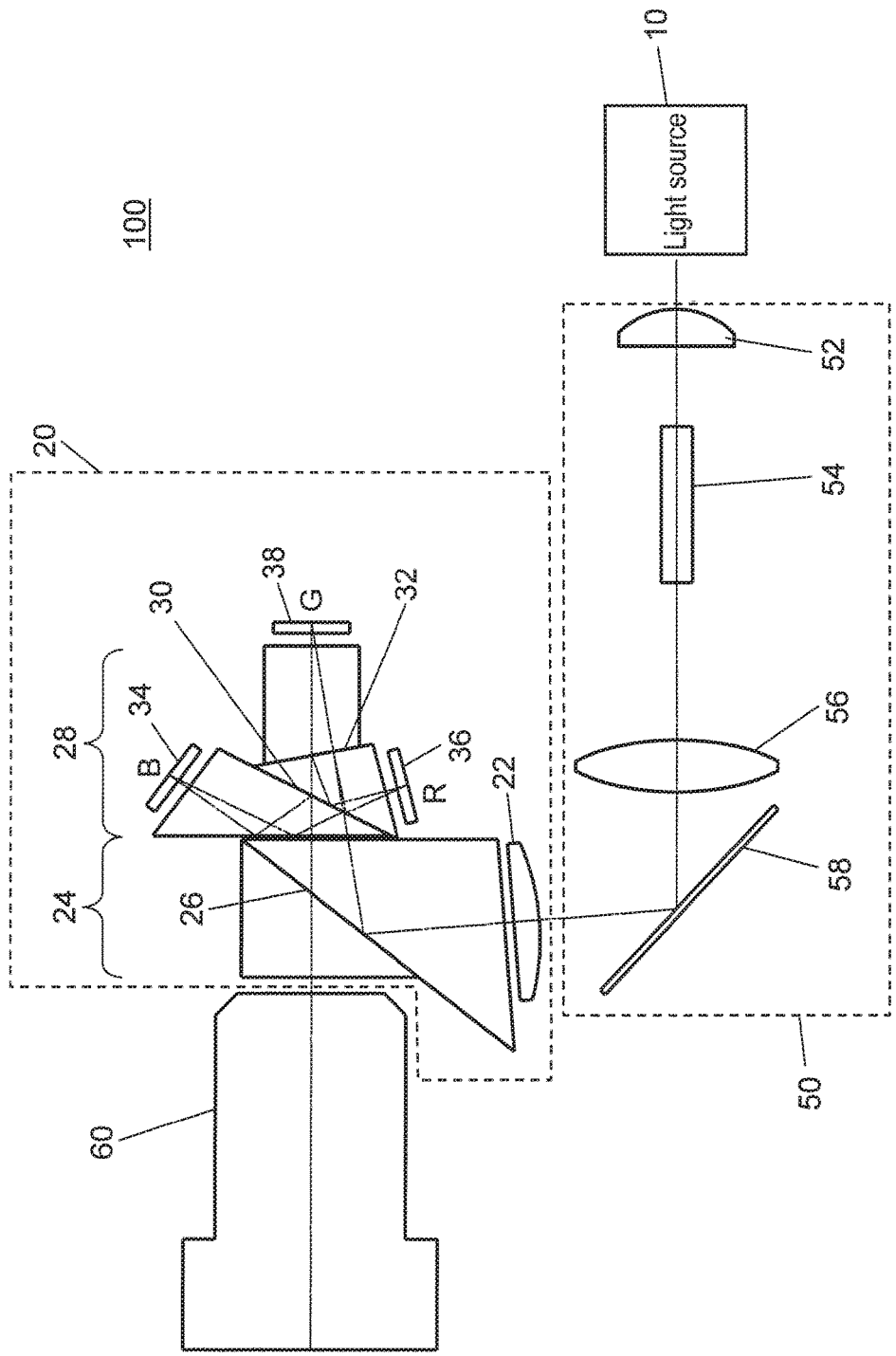

PROJECTION VIDEO DISPLAY

RELATED APPLICATIONS

This application claims the benefit of Japanese Application No. 2015-197267, filed on Oct. 5, 2015, the disclosure of which is incorporated by reference herein.

BACKGROUND

1. Technical Field

The present disclosure relates to a projection video display that has a three-dimensional (3D) video display function and employs a pixel shift technique to project high-density video.

2. Description of Related Art

Some conventionally known projection video displays have a wobbling element in order to achieve high-resolution, high-quality video. A wobbling element is an element that controls an optical path of video image generated by a video generator such as a liquid crystal display element, thus changing a location at which the video image is displayed on the projection surface.

With the above wobbling element, the projection video display can provide high-resolution video even when receiving a video input signal whose resolution is higher than that of the video generator (e.g., refer to Unexamined Japanese Patent Publication No. 2006-047414).

SUMMARY

A projection video display of the present disclosure includes a video generator, an optical system, an optical path changer, and a controller. The video generator generates video image. The optical system projects the video image onto a projection surface. The optical path changer is disposed in an optical path of the video image and changes a location at which the video image is displayed on the projection surface. The controller controls the video generator and the optical path changer, based on a video input signal. The controller generates a left-eye video signal and a right-eye video signal, which are viewpoint images for three-dimensional (3D) video, from the video input signal. The controller spatially splits signals indicating frames in each of the left-eye video signal and the right-eye video signal to generate signals indicating a plurality of types of subframes. The controller controls the optical path changer so as to maintain the location at which the video image is displayed on the projection surface before and after a time when a subframe in the left-eye video signal and a subframe in the right-eye video signal are switched. The controller controls the video generator such that, when a first frame is switched to a second frame, a last subframe in the first frame and a first subframe in the second frame have a same type and are related to different viewpoint images.

According to the present disclosure, a projection video display suppresses deterioration of its quality caused by optical path changes.

BRIEF DESCRIPTION OF DRAWINGS

FIG. 3 is a schematic view of an optical configuration of the projection video display;

DETAILED DESCRIPTION

Some exemplary embodiments will be described below in detail with appropriate reference to the accompanying drawings. In some cases, excessive details will not be described. For example, details of a matter already known in the art will not be described, and components substantially the same as those already described will not be described again. The reason is to prevent the following description from being needlessly redundant, facilitating an understanding of those skilled in the art.

The applicant will provide the accompanying drawings and the following description for the purpose of helping those skilled in the art sufficiently understand the present disclosure, and therefore the accompanying drawings and the following description are not intended to limit a subject matter described in the claims.

First Exemplary Embodiment 1-1. Configuration of Projection Video Display

Figure 1:
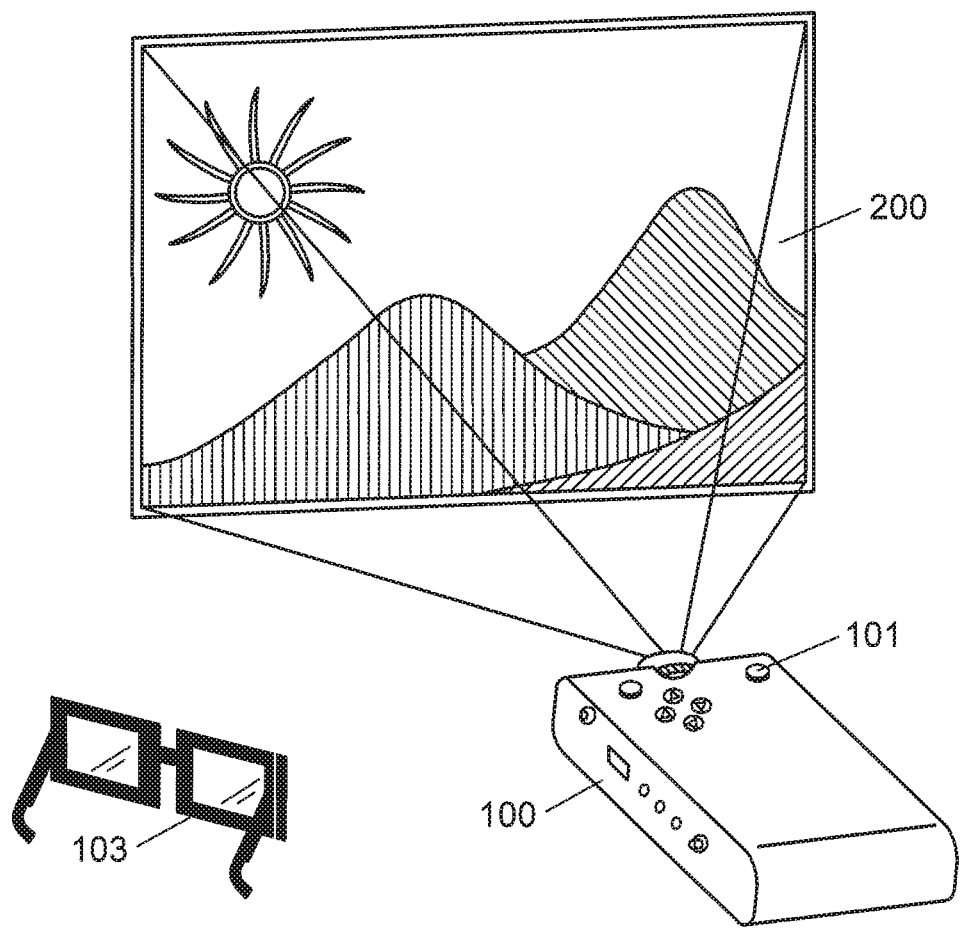
FIG. 1 is a perspective view of the exterior of a projection video display.

A configuration of a projection video display will be described with reference to FIG. 1 and FIG. 2. FIG. 1 is a perspective view of the exterior of projection video display 100 that can display 3D video, screen 200, and liquid crystal shutter glasses 103 for use in watching a three-dimensional (3D) image.

Projection video display 100 projects, onto screen 200 in a temporally alternate manner, video image of viewpoint videos (left-eye image and right-eye image) generated in accordance with a video input signal. Projection video display 100 includes emitter 101, which outputs control signals for use in controlling an open/close operation of liquid crystal shutter glasses 103 in synchronization with images to be displayed. Liquid crystal shutter glasses 103 are equipped with a receiver (not illustrated) that receives the control signals from emitter 101. Liquid crystal shutter glasses 103 cause the liquid crystal shutters for left and right eyes to close in an alternate manner in response to the control signals, namely, in synchronization with images to be displayed by projection video display 100.

Figure 2A:
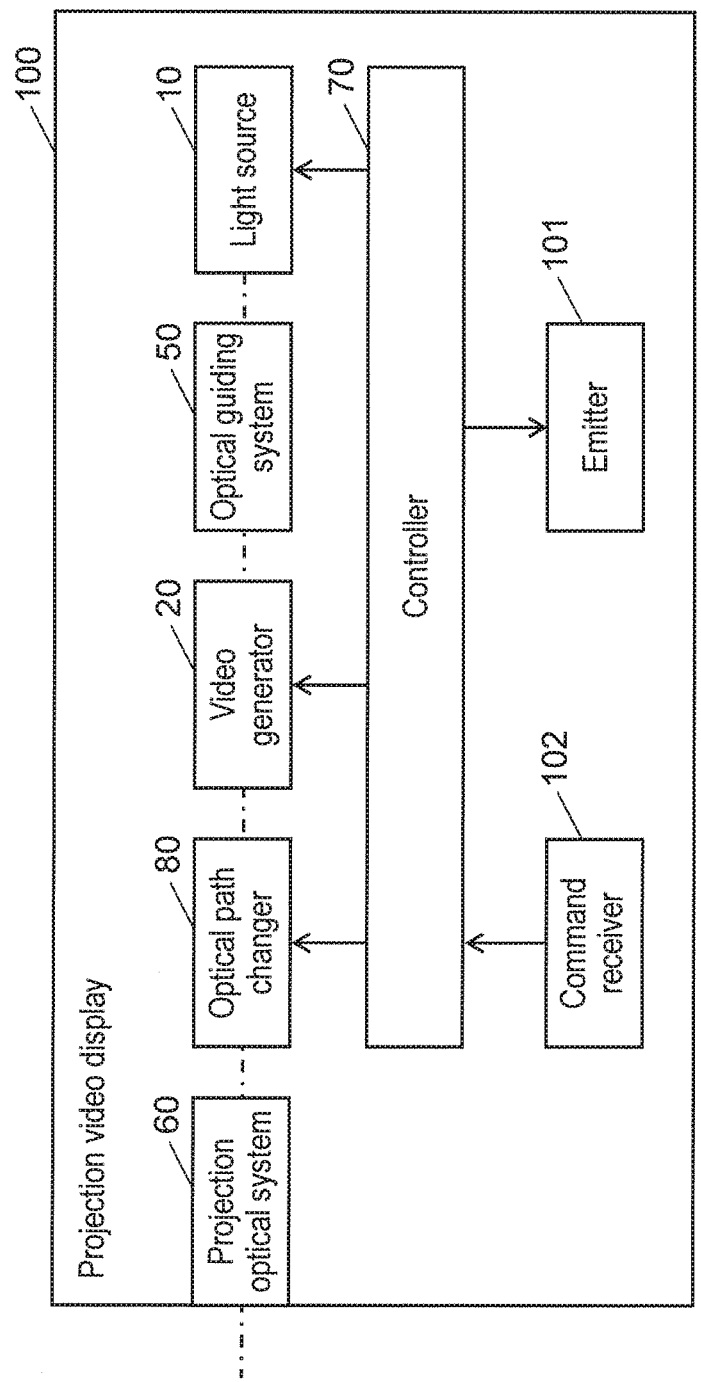
FIG. 2A is a block diagram illustrating a configuration of the projection video display.
Figure 2B:
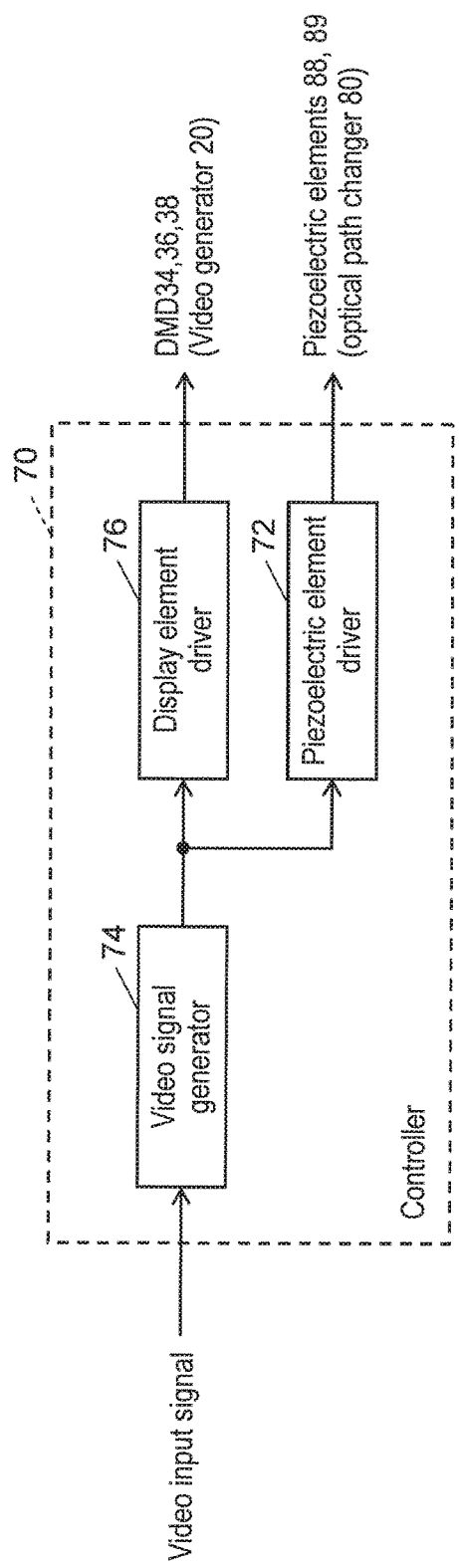
FIG. 2B is a block diagram illustrating a configuration of a controller.

FIG. 2A is a block diagram illustrating a configuration of projection video display 100. Projection video display 100 includes light source 10, video generator 20, optical guiding system 50, and projection optical system 60. Video generator 20 generates video image in accordance with a video input signal. Optical guiding system 50 guides light emitted from light source 10 to video generator 20. Projection optical system 60 projects the video image generated in the above manner onto screen 200. Projection video display 100 further includes command receiver 102, emitter 101, and controller 70. Command receiver 102 receives a command generated through an operation of a button in a remote controller or a main body of projection video display 100. Emitter 101 is used to output a control signal for use in controlling an open/close operation of liquid crystal shutter glasses 103 in synchronization with an image to be displayed. Controller 70 controls light source 10, video generator 20, and other components. FIG. 2B is a block diagram illustrating a configuration of controller 70. Controller 70 includes video signal generator 74, display element driver 76, and piezoelectric element driver 72.

Command receiver 102 receives a result of selecting one of a normal video display mode and a 3D video display mode through an operation of a button in the remote controller or the main body. In the normal video display mode, video generator 20 generates video for a single viewpoint in accordance with a video input signal. In the 3D video display mode, video generator 20 generates a left-eye image and a right-eye image in accordance with a video input signal.

Projection video display 100 further includes optical path changer 80, which changes the optical path of the video image generated by video generator 20. More specifically, optical path changer 80 shifts the location at which the video image generated by video generator 20 is displayed on screen 200, within the range of a pixel length or less (e.g., a half of a pixel length). Details of this operation will be described later. The above operation of optical path changer 80 enables projection video display 100 to provide video with its resolution perceived to be higher than that of the video image generated by video generator 20.

1-2. Optical Configuration of Projection Video Display

An optical configuration of projection video display 100 will be described with reference to FIG. 3. FIG. 3 is a schematic view of an optical configuration of projection video display 100.

White light emitted from light source 10 enters optical guiding system 50. When entering optical guiding system 50, the white light passes through lens 52 and then is focused on or close to the incident surface of rod 54. Then, the white light enters rod 54 and is reflected on the inner surface of rod 54 several times. As a result, the white light is output from rod 54 with its light intensity distribution being substantially uniform. The white light that has output from rod 54 is focused on mirror 58 by lens 56. In this case, lens 56 may be a relay lens that causes an image on the output surface of rod 54 to be formed on DMDs (digital mirror devices), which will be described later. The white light that has been output from lens 56 is reflected by mirror 58 and then enters video generator 20.

When entering video generator 20, the white light passes through lens 22 and then is incident on total internal reflection prism 24. In this case, lens 22 substantially collimates and focuses the incident light.

Total internal reflection prism 24 includes a first prism, a second prism, and thin air layer 26 formed between the opposing surfaces of the first and second prisms. When light is incident on air layer 26 at an angle equal to or greater than its critical angle, all the light is reflected. When the white light that has output from lens 22 enters total internal reflection prism 24, all the white light is reflected by air layer 26 (total reflection surface) and then enters color prism 28.

Color prism 28 includes a first prism, a second prism, and a third prism. Blue-light reflection dichroic film 30 is formed between the first and second prisms, and red-light reflection dichroic film 32 is formed between the second and third prisms. When entering color prism 28, the white light is separated into blue light, red light, and green light by both blue-light reflection dichroic film 30 and red-light reflection dichroic film 32. Then, the blue light enters DMD 34, the red light enters DMD 36, and the green light enters DMD 38. In this case, each of DMDs 34, 36, 38 changes angles of the micro mirrors in accordance with a video input signal, thereby reflecting incident light at different angles. As a result, the reflected light enters a projection lens in projection optical system 60 or is led to the outside of the active area of the projection lens.

The light that has been reflected by DMD 34, the light that has been reflected by DMD 36, and the light that has been reflected by DMD 38 pass through color prism 28 again. During the passage inside color prism 28, the blue light, the red light, and the green light, into which the white light has been separated, are combined together and then this combined light enters total internal reflection prism 24. In this case, when entering total internal reflection prism 24, the combined light is incident on air layer 26 at an angle smaller than the critical angle. Thus, the incident light passes through air layer 26 and then enters projection optical system 60. In this way, the video image created by DMDs 34, 36, 38 is projected onto the screen.

Using the DMDs 34, 36, 38 as video display elements enables a projection video display to exhibit higher light and heat resistance than by using liquid crystal display elements (liquid crystal panels). Moreover, using three DMDs for blue light, red light, and green light enables a projection video display to exhibit good color reproduction and to produce bright, high-resolution projection video.

1-3. Optical Configuration of Optical Path Changer

Figure 4:
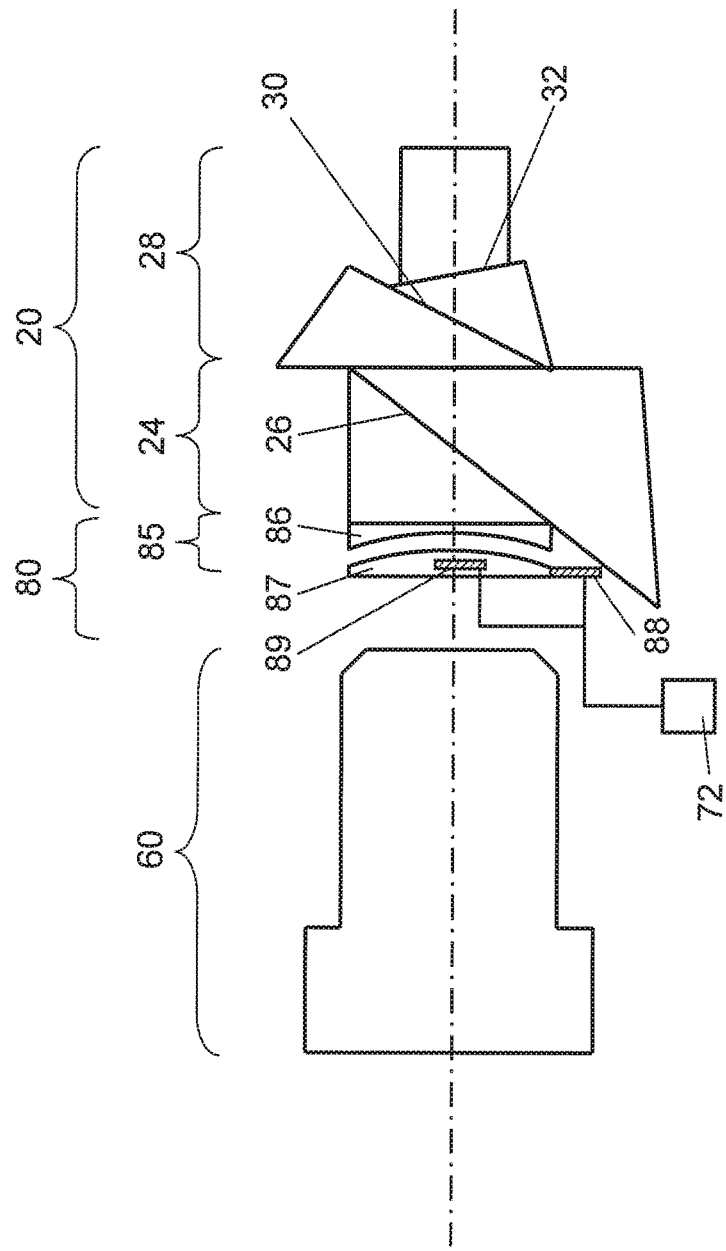
FIG. 4 is a schematic view of an optical configuration of the projection video display between a video generator and a projection optical system.

With reference to FIG. 4, a description will be given of a configuration of optical path changer 80 in projection video display 100 in this exemplary embodiment. FIG. 4 is a schematic view of an optical configuration of the projection video display in this exemplary embodiment between video generator 20 and projection optical system 60. Optical path changer 80 is disposed in front of projection optical system 60.

Optical path changer 80 includes lens unit 85 and piezoelectric elements 88, 89. Lens unit 85 includes lenses 86, 87 and cancels the refractive indices of lenses 86, 87. Each of piezoelectric elements 88, 89 moves a corresponding one of the lenses in lens unit 85 in two directions within a plane perpendicular to the optical axis of projection optical system 60. Piezoelectric elements 88, 89 are electrically connected to piezoelectric element driver 72. Piezoelectric element driver 72 supplies electricity to piezoelectric elements 88, 89, thereby controlling deformation of piezoelectric elements 88, 89. Lens unit 85 may include three or more lenses. Herein, each of piezoelectric elements 88, 89 may be an exemplary actuator.

Lens 86 in lens unit 85 may be a plano-concave lens; the surface that faces total internal reflection prism 24 is flat and the surface that faces lens 87 functions as a concave surface. Lens 86 is fixed with the flat surface being in contact with total internal reflection prism 24. Lens 87 in lens unit 85 may be a plano-convex lens; the surface that faces lens 86 functions as a convex lens and the surface that faces projection optical system 60 is flat. Lens 87 is disposed between projection optical system 60 and lens 86, and predetermined spacings are provided between lens 87 and projection optical system 60 and between lens 87 and lens 86.

Piezoelectric elements 88, 89 in lens unit 85 are connected to piezoelectric element driver 72. Each of piezoelectric elements 88, 89 moves lens 87 in at least two directions within a plane perpendicular to the optical axis of projection optical system 60, in accordance with a drive signal (applied voltage) from piezoelectric element driver 72.

Figure 5:
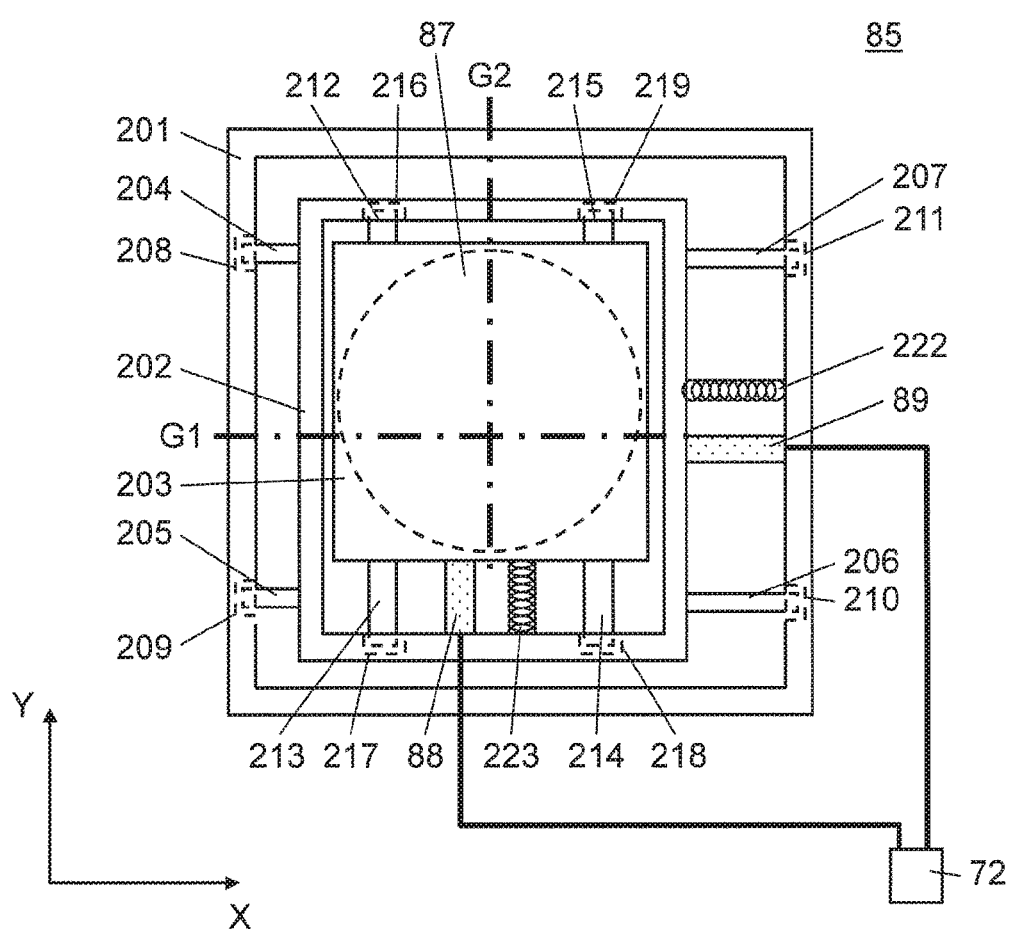
FIG. 5 is a schematic view of an exemplary configuration of a lens unit.

FIG. 5 is a schematic view of an exemplary configuration of lens unit 85. As illustrated in FIG. 5, piezoelectric elements 88, 89 in lens unit 85 have lens outer frame 201, lens inner frame 202, and lens fixture 203 made of a glass substrate.

Lens inner frame 202 is provided with strut 204, strut 205, strut 206, and strut 207. Lens outer frame 201 is provided with reception hole 208, reception hole 209, reception hole 210, and reception hole 211. Strut 204 is inserted into reception hole 208. Strut 205 is inserted into reception hole 209. Strut 206 is inserted into reception hole 210. Strut 207 is inserted into reception hole 211. The cross-sectional area of reception holes 208, 209, 210, and 211 is set to be larger than that of struts 204, 205, 206, and 207. Thus, lens inner frame 202 is supported by lens outer frame 201 so as to be movable relative to lens outer frame 201.

Lens fixture 203 is provided with strut 212, strut 213, strut 214, and strut 215. Lens inner frame 202 is provided with reception hole 216, reception hole 217, reception hole 218, and reception hole 219. Strut 212 is inserted into reception hole 216. Strut 213 is inserted into reception hole 217. Strut 214 is inserted into reception hole 218. Strut 215 is inserted into reception hole 219. The cross-sectional area of reception holes 216, 217, 218, and 219 is set to be larger than that of struts 212, 213, 214, and struts 215. Thus, lens fixture 203 is supported by lens inner frame 202 so as to be movable relative to lens inner frame 202.

Each of piezoelectric elements 88, 89 is an element that varies its length in response to applied voltage. More specifically, when a voltage is applied, each of piezoelectric elements 88, 89 increases its length; when the application of the voltage is stopped, each of piezoelectric elements 88, 89 decreases its length. Piezoelectric element 89 is fixed to lens outer frame 201 and is in contact with lens inner frame 202. Piezoelectric element 88 is fixed to lens inner frame 202 and is in contact with lens fixture 203. Piezoelectric elements 88, 89 are electrically connected to piezoelectric element driver 72. Piezoelectric element driver 72 individually supplies drive signals (voltages) to piezoelectric elements 88, 89. When supplied with a drive signal from piezoelectric element driver 72, each of piezoelectric elements 88, 89 increases its length.

Spring 222 is disposed close to piezoelectric element 89 with its first end fixed to lens outer frame 201 and with its second end fixed to lens inner frame 202. Spring 222 resists a force generated in the direction in which piezoelectric element 89 increases its length and applies a tension to lens inner frame 202 and lens outer frame 201 so as to be attracted to each other. Piezoelectric element 89 pushes lens inner frame 202 when increasing its length, thereby moving lens inner frame 202 in the negative direction of the X axis, relative to lens outer frame 201. Spring 222 attracts lens inner frame 202 when piezoelectric element 89 decreases its length, thereby moving lens inner frame 202 in the positive direction of the X axis, relative to lens outer frame 201.

Spring 223 is disposed close to piezoelectric element 88 with its first end fixed to lens inner frame 202 and with its second end fixed to lens fixture 203. Spring 223 resists a force generated in the direction in which piezoelectric element 88 increases its length and applies a tension to lens inner frame 202 and lens fixture 203 so as to be attracted to each other. Piezoelectric element 88 pushes lens fixture 203 when increasing its length, thereby moving both lens 87 and lens fixture 203 in the positive direction of the Y axis, relative to lens inner frame 202. Spring 223 attracts lens fixture 203 when piezoelectric element 88 decreases its length, thereby moving both lens 87 and lens fixture 203 in the negative direction of the Y axis, relative to lens inner frame 202.

Both piezoelectric element 89 and spring 222 are disposed close to center of gravity G1 on the Y axis. Center of gravity G1 on the Y axis corresponds to the center of gravity of a lens section on the Y axis; the lens section is constituted by: lens 87; lens inner frame 202 that functions as a lens holder for lens 87; and lens fixture 203. Both piezoelectric element 88 and spring 223 are disposed close to center of gravity G2 of the lens section on the X axis.

1-4. Operation of Projection Video Display

Projection video display 100 operates in two video projection modes; the first one is a 3D video display mode in which 3D video containing videos for a plurality of viewpoints is displayed, and the second one is a normal mode in which video for a single viewpoint is displayed.

1-4-1. Normal Mode

Using optical path changer 80 configured above can display video with its resolution being four times that of DMDs 34, 36, 38. More specifically, projection video display 100 splits a video input signal whose resolution is four times that of DMDs into a plurality of subframes, and then projects these subframes onto screen 200 at different locations. In this way, projection video display 100 can project a video input signal whose resolution is higher than that of DMDs onto screen 200. A description will be given below of control that achieves a quadruple resolution, with reference to FIG. 6 and FIG. 7.

To display video with its resolution being four times that of DMDs 34, 36, 38, video signal generator 74 (spatially) splits a video input signal indicating a single frame (e.g., N-th frame) pixel by pixel, and then generates four subframes made up of pixels disposed at different locations. After that, video signal generator 74 outputs the four subframes in order within the period of the single frame.

Figure 6:
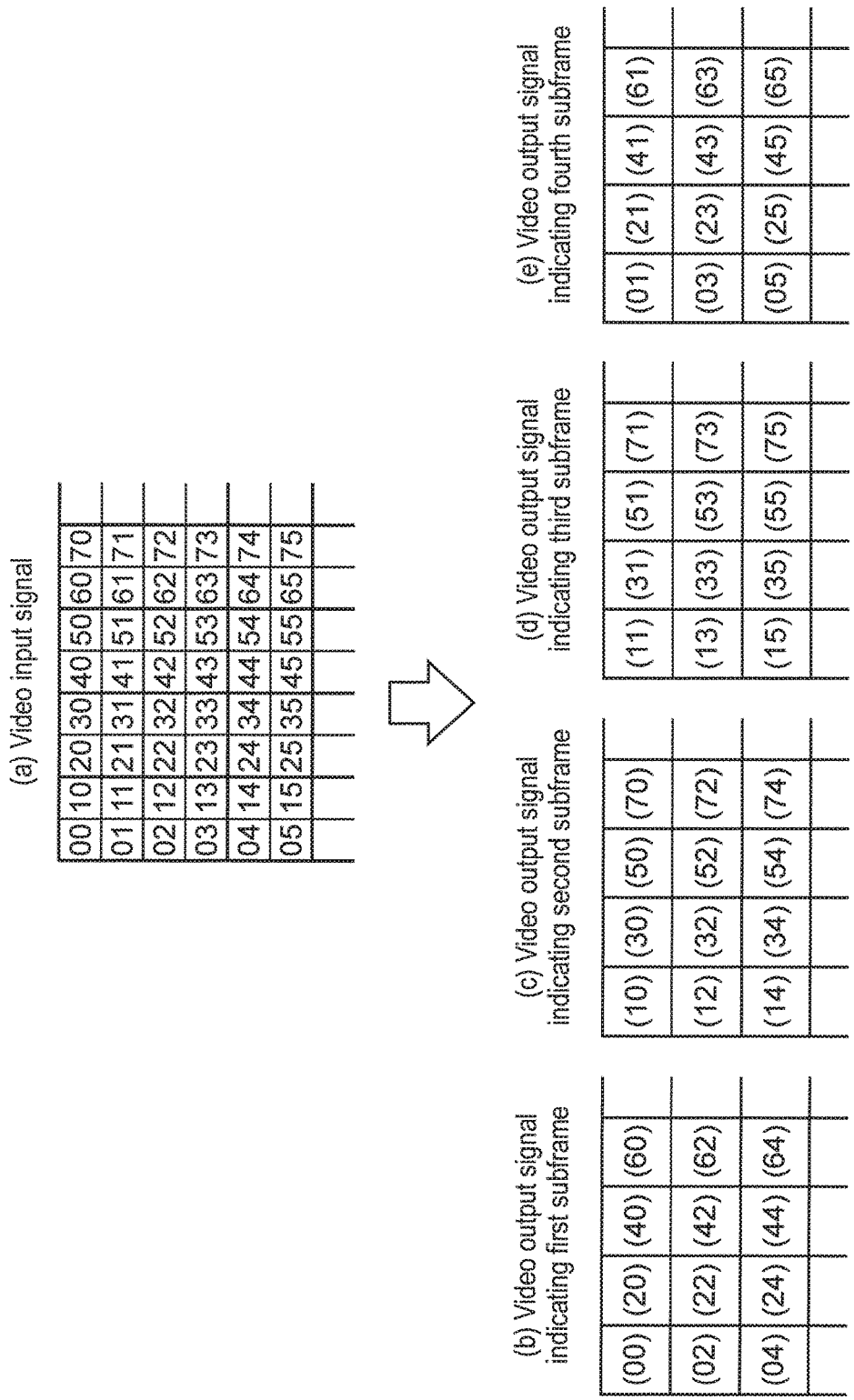
FIG. 6 is an illustrative diagram of a method for generating subframes.

More specifically, as illustrated in FIG. 6, for example, video signal generator 74 handles four (2×2) pixels as a single block and then splits the video input signal into a plurality of subframes by using a single pixel in each block. As an example, video signal generator 74 selects the upper left pixel in each block from among the pixels contained in the video input signal, and then generates a video signal indicating a first subframe from the signals related to the selected upper left pixels. In other words, video signal generator 74 selects a quarter of all the pixels in the video input signal, and then generates a video signal indicating a first subframe from the selected pixels. In this case, the resolution of the video signal indicating the first subframe is equal to a quarter of that of the video input signal. Likewise, a video signal indicating a second subframe is related to the upper right pixel in each block in the video input signal. A video signal indicating a third subframe is related to the lower right pixel in each block in the video input signal. A video signal indicating a fourth subframe is related to the lower left pixel in each block in the video input signal. Then, video signal generator 74 outputs the video signal indicating the first subframe, the video signal indicating the second subframe, the video signal indicating the third subframe, and the video signal indicating the fourth subframe to the display element driver 76 in this order. Furthermore, video signal generator 74 outputs a synchronization signal to piezoelectric element driver 72, which is used to make the timing at which a subframe is switched to another subframe coincide with the timing at which optical path changer 80 shifts a location at which video image is displayed on screen 200 (changes an optical path of video image).

Figure 7:
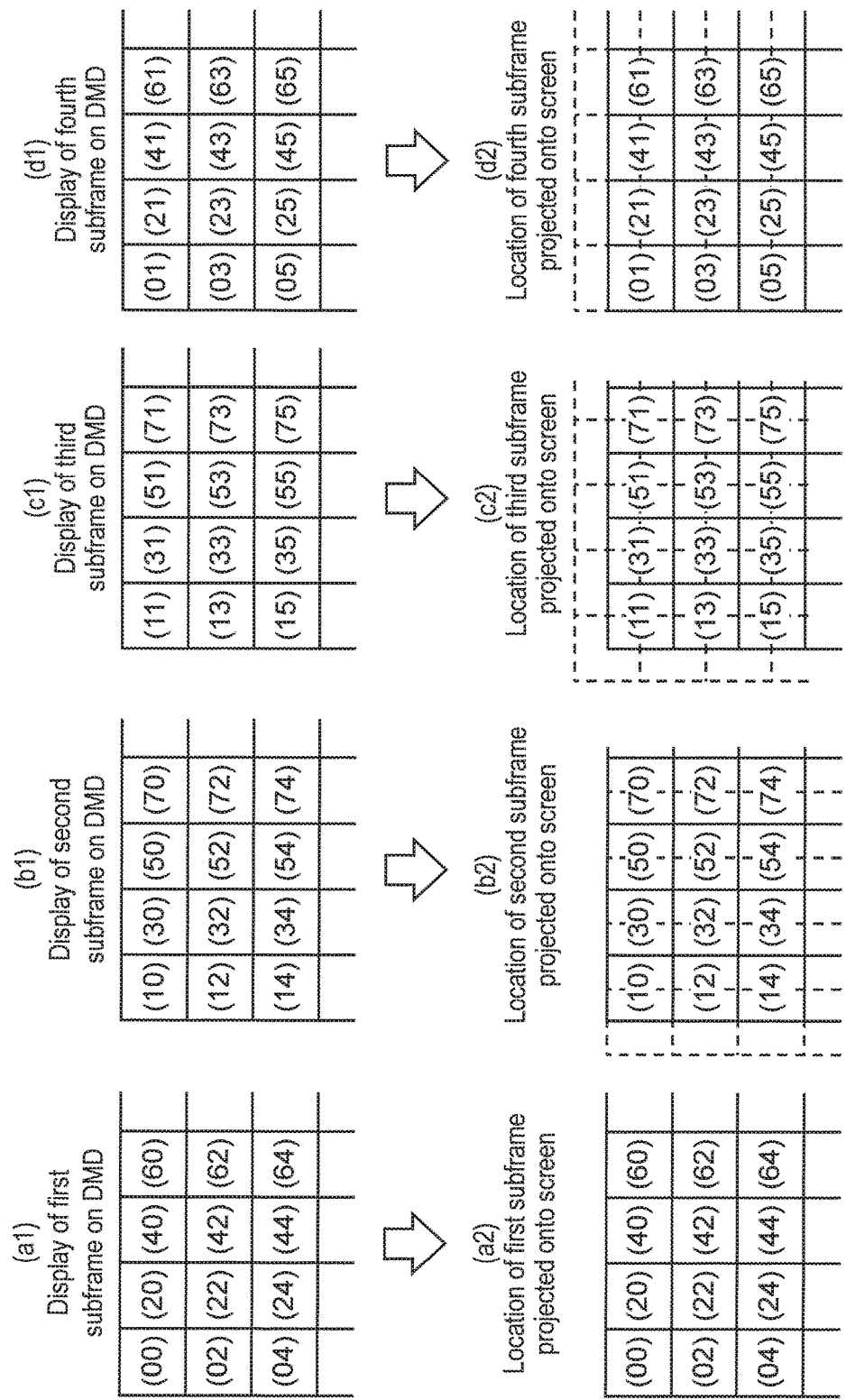
FIG. 7 is an illustrative diagram of locations at which the subframes are displayed.

As illustrated in FIG. 7, while DMDs 34, 36, 38 are displaying the video of the first subframe, optical path changer 80 causes the video image to be projected onto screen 200 at a predetermined location (reference location). While DMDs 34, 36, 38 are displaying the video of the second subframe, optical path changer 80 changes the optical path of the video image such that the video image is projected onto screen 200 at the location denoted by the solid line, which is shifted rightward by a half of the pixel length from the reference location denoted by the broken line. In this case, piezoelectric element 89 increases its length, and lens unit 85 bends the optical path of the video image. While DMDs 34, 36, 38 are displaying the video of the third subframe, optical path changer 80 changes the optical path of the video image such that the video image is further moved downward by a half of the pixel length and thus projected onto screen 200 at the location denoted by the solid line, which is shifted rightward by a half of the pixel length and downward by a half of the pixel length from the reference location. While DMDs 34, 36, 38 are displaying the video of the fourth subframe, optical path changer 80 changes the optical path of the video image such that the video image is further moved leftward by a half of the pixel length and thus projected onto screen 200 at the location denoted by the solid line, which is shifted downward by a half of the pixel length from the reference location. In this way, projection video display 100 can display the video with its pixels arranged in conformity with those of an original video input signal and with its resolution perceived to be four times that of DMDs 34, 36, 38.

Figure 8:
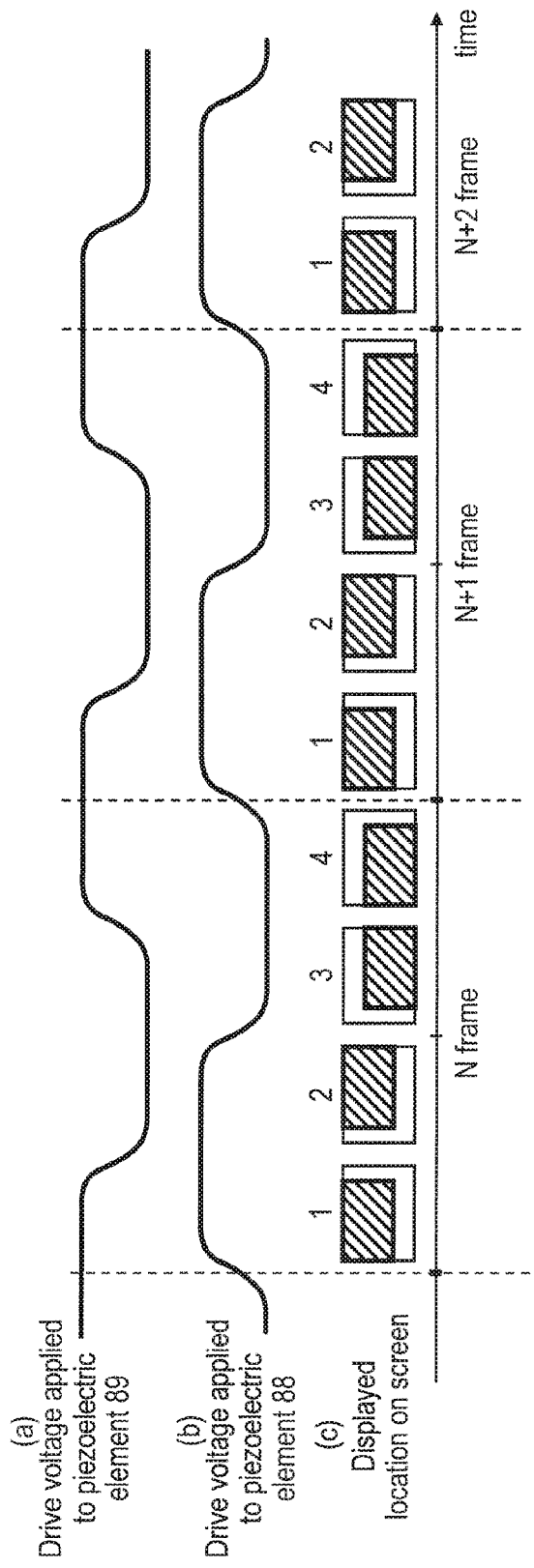
FIG. 8 is a diagram illustrating changes in drive voltages applied to piezoelectric elements that move a lens.

Next, a description will be given of control over which video of an N-th frame is switched to video of an (N+1)-th frame. FIG. 8 illustrates waveforms of drive voltages applied to piezoelectric elements 88, 89 in this exemplary embodiment. The part (a) illustrates a waveform of a drive voltage applied to piezoelectric element 89 when lens 87 moves in the directions of the X axis. The part (b) illustrates a waveform of a drive voltage applied to piezoelectric element 88 when lens 87 moves in the directions of the Y axis. The part (c) illustrates locations at which the video image is displayed on screen 200 when the video image shifted by optical path changer 80 is projected onto screen 200.

Video signal generator 74 generates video output signals indicating a first subframe, a second subframe, a third subframe, and a fourth subframe from a video input signal indicating a single frame. More specifically, the first subframe is generated from the signal indicating the upper left pixels in blocks, each of which contains 2×2 pixels in the video input signal. The second subframe is generated from the signal indicating the upper right pixel in each block. The third subframe is generated from the signal indicating the lower right pixel in each block. The fourth subframe is generated from the signal indicating the lower left pixel in each block. After that, video signal generator 74 outputs the video output signals indicating the first subframe, the second subframe, the third subframe, and the fourth subframe to display element driver 76 in this order. Moreover, video signal generator 74 outputs a synchronization signal to piezoelectric element driver 72, which is used to make the timing at which DMDs 34, 36, 38 switch subframes coincide with the timing at which optical path changer 80 shifts a location at which the video image is displayed on screen 200.

When switching the video of the N-th frame to the video of the (N+1)-th frame, video signal generator 74 displays the fourth subframe for the N-th frame, which is the subframe in the N-th frame displayed at last, and then displays the first subframe for the (N+1)-th frame, which is the subframe in the (N+1)-th frame displayed at first. In this case, piezoelectric element driver 72 causes optical path changer 80 to change a location at which the video image is to be displayed on screen 200 to a location related to the first subframe.

1-4-2. 3D Video Display Mode

In the 3D video display mode, controller 70 alternately outputs two respective subframes for left-eye video and right-eye video in relation to their displayed locations. Then, controller 70 drives optical path changer 80 so as to display video with its resolution being twice that of DMDs 34, 36, 38. In addition, controller 70 controls optical path changer 80 and the timing of an open/close operation of liquid crystal shutter glasses to be worn by the viewer when a viewer watches 3D video.

Video signal generator 74 (spatially) splits a video input signal indicating a single frame (e.g., N-th frame) pixel by pixel, and then generates two subframes made up of pixels disposed at different locations. After that, video signal generator 74 outputs the two subframes in order within the period of the single frame.

Figure 9:
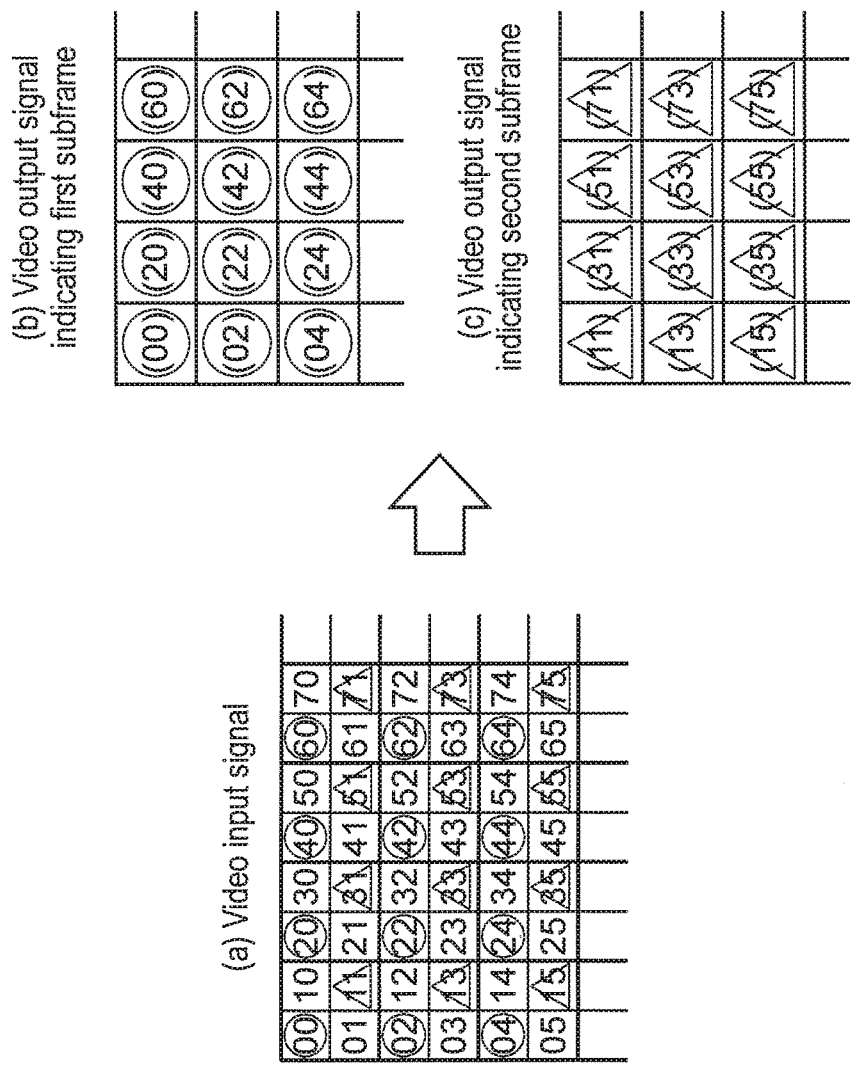
FIG. 9 is an illustrative diagram of a method for generating subframes.

First, video signal generator 74 generates a video signal indicating a first subframe and a video signal indicating a second subframe, as a video input signal indicating an N-th frame for the left-eye video. Then, video signal generator 74 outputs the generated video signals to display element driver 76 in a predetermined sequence. As illustrated in FIG. 9, for example, the video signal indicating the first subframe is related to the upper left pixels (marked with a circle) in blocks, each of which contains four (2×2) pixels. In other words, the video signal indicating the first subframe is related to the upper left pixels in the blocks in a video input signal indicating the left-eye video. The video signal indicating the second subframe is related to the lower right pixels (marked with a triangle) in the blocks in the video input signal indicating the left-eye video.

Next, similar to the case of the left-eye video, video signal generator 74 generates a video signal indicating a first subframe and a video signal indicating a second subframe, as a video input signal indicating the N-th frame for the right-eye video. Then, video signal generator 74 outputs the generated video signals to display element driver 76 in a predetermined sequence. The video signal indicating the first subframe is related to the upper left pixels in blocks in the video input signal for the right-eye video. The video signal indicating the second subframe is related to the lower right pixels in the blocks in the video input signal for the right-eye video.

Video signal generator 74 subsequently subjects the same process to a video input signal indicating an (N+1)-th frame for the left-eye video and a video input signal indicating an (N+1)-th frame for the right-eye video.

Video signal generator 74 also outputs a synchronization signal to piezoelectric element driver 72, which is used to make the timing at which DMDs 34, 36, 38 switch subframes coincide with the timing at which optical path changer 80 shifts a location at which the video image is displayed on screen 200.

Figure 10:
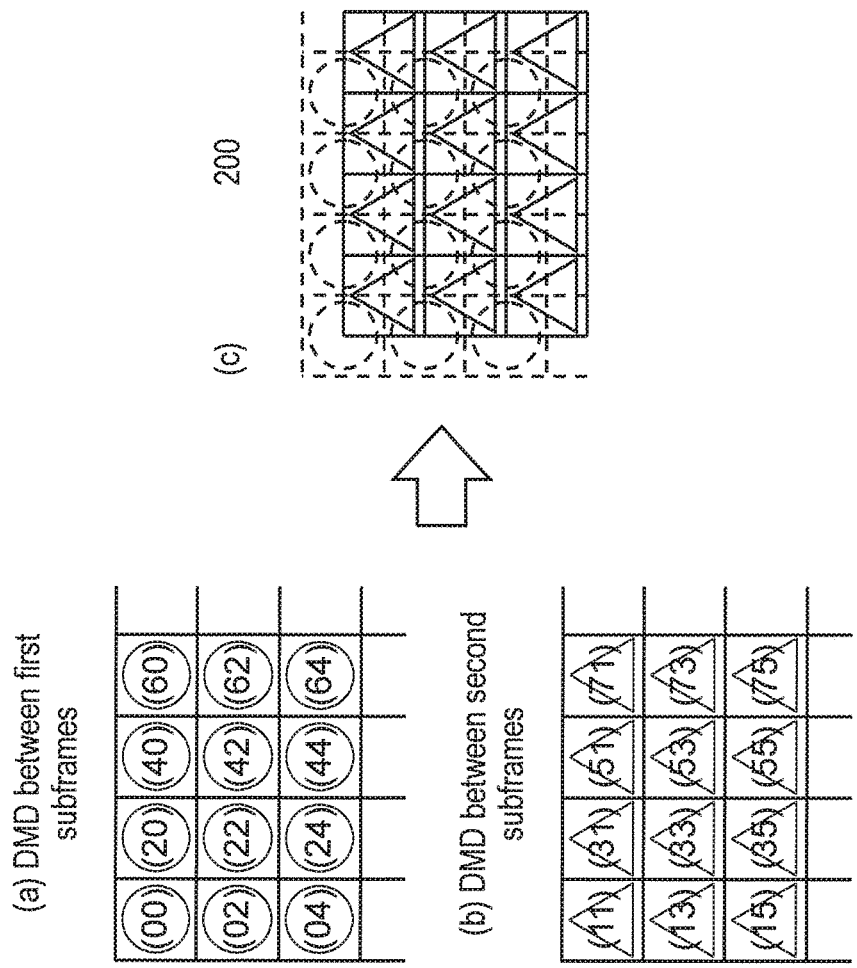
FIG. 10 is an illustrative diagram of control over which 3D video is displayed.

Next, a description will be given of control over which optical path changer 80 configured above displays 3D video with its resolution being twice that of DMDs 34, 36, 38, with reference to FIG. 10.

While DMDs 34, 36, 38 are displaying the video of the first subframe, optical path changer 80 projects video image onto screen 200 at a predetermined location (reference location) denoted by the broken line. While DMDs 34, 36, 38 are displaying the video of the second subframe, optical path changer 80 changes the optical path of the video image such that the video image is projected onto screen 200 at the location denoted by the solid line, which is shifted rightward by a half of the pixel length and downward by a half of the pixel length from the reference location denoted by the broken line. In this case, piezoelectric element 88 and piezoelectric element 89 increase their lengths, and lens unit 85 bends the optical path of the video image.

In the above way, projection video display 100 can display video with its resolution perceived to be twice that of DMDs 34, 36, 38.

Figure 11:
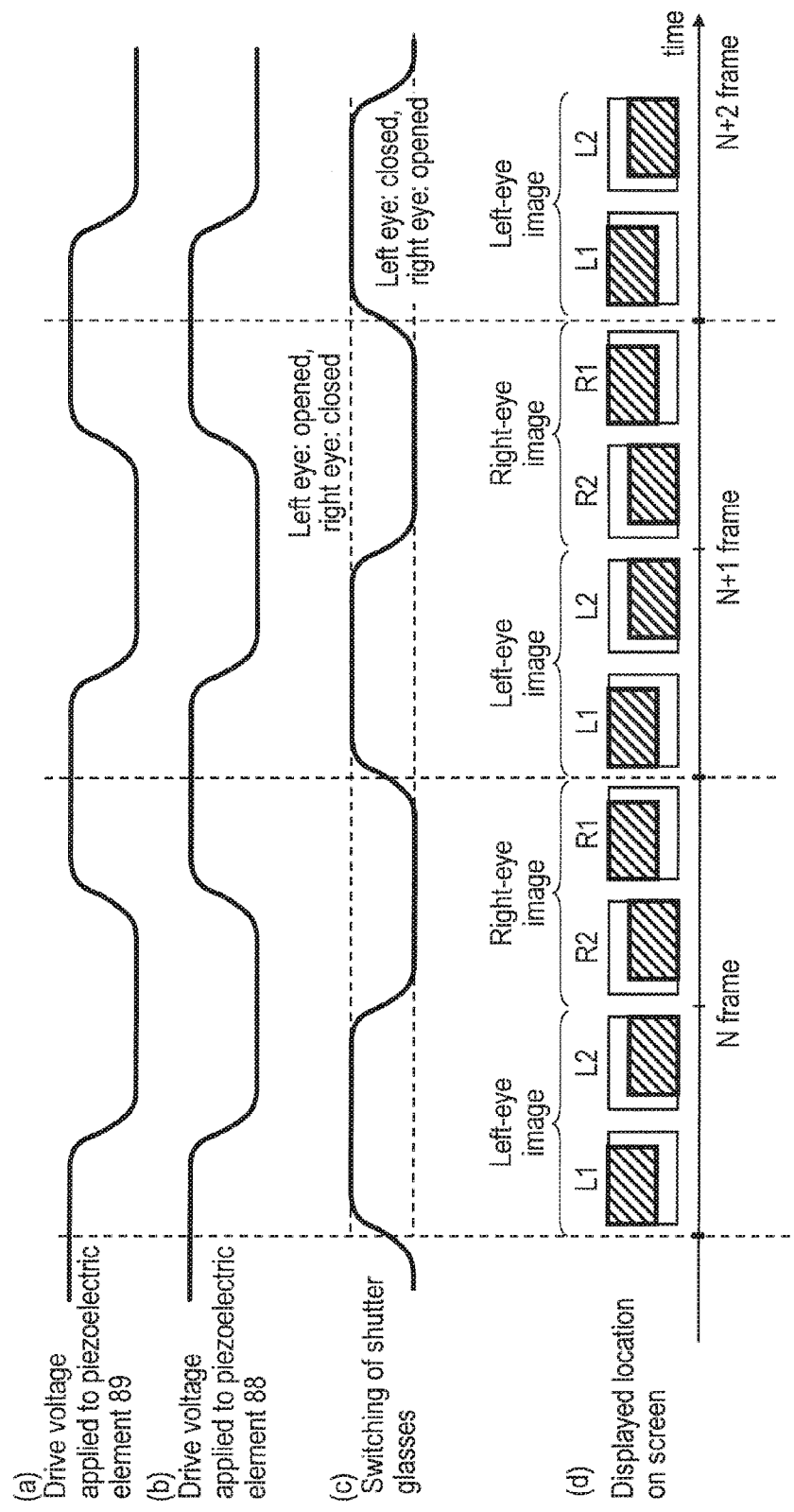
FIG. 11 is a diagram illustrating waveforms of drive voltages applied to the piezoelectric elements in a first exemplary embodiment.

Next, a description will be given of control over which video of an N-th frame is switched to video of an (N+1)-th frame. FIG. 11 illustrates waveforms of drive voltages applied to piezoelectric elements 88, 89. The part (a) illustrates a waveform of a drive voltage applied to piezoelectric element 89 when lens 87 moves in the directions of the X axis. The part (b) illustrates a waveform of a drive voltage applied to piezoelectric element 88 when lens 87 moves in the directions of the Y axis. The part (c) illustrates a timing waveform (synchronization signal) that causes shutter glasses to switch a light shielding state between the right side and the left side. The part (d) illustrates locations at which the video image is displayed on screen 200 when the video image shifted by optical path changer 80 is projected onto screen 200.

Next, a description will be given of control over which video of an N-th frame in the left-eye image is switched to video of an N-th frame in the right-eye image (N is any natural number). As illustrated in FIG. 11, video signal generator 74 controls optical path changer 80 so as to maintain a location at which the video image is displayed on screen 200 at the time when video of an N-th frame for the left-eye image is switched to video of an N-th frame for the right-eye image.

A signal related to the upper left pixels in blocks in a video input signal for the left-eye image is referred to as first subframe L1. Likewise, a signal related to the lower right pixels in the blocks is referred to as second subframe L2. Video signal generator 74 generates first subframe L1 and second subframe L2 as video output signals, based on a video input signal indicating the N-th frame for the left-eye image. Then, video signal generator 74 outputs generated first subframe L1 and second subframe L2 to display element driver 76 in this order. Moreover, video signal generator 74 generates a synchronization signal used to make the timing at which the display of DMDs 34, 36, 38 is switched from the first subframe to the second subframe coincide with the timing at which optical path changer 80 shifts a location at which video image is displayed on screen 200. Then, video signal generator 74 outputs the synchronization signal to piezoelectric element driver 72.

Next, video signal generator 74 generates first subframe R1 and second subframe R2 as video output signals, based on a video input signal indicating the N-th frame for the right-eye image. The first subframe R1 corresponds to a signal related to the upper left pixels in blocks in a video input signal for the right-eye image. The second subframe R2 corresponds to a signal related to the lower right pixels in the blocks in the video input signal for the right-eye image. Video signal generator 74 outputs generated second subframe R2 and first subframe R1 to display element driver 76 in this order. Moreover, video signal generator 74 generates a synchronization signal used to make the timing at which the display of DMDs 34, 36, 38 is switched from the second subframe to the first subframe coincide with the timing at which optical path changer 80 shifts a location at which video image is displayed on screen 200. Then, video signal generator 74 outputs the synchronization signal to piezoelectric element driver 72.

In short, video signal generator 74 controls DMDs 34, 36, 38 so as to display second subframe L2 of the N-th frame for the left-eye image and then to display second subframe R2 of the N-th frame for the right-eye image. In addition, video signal generator 74 controls DMDs 34, 36, 38 so as to display first subframe R1 of the N-th frame for the right-eye image and then to display first subframe L1 of an (N+1)-th frame for the left-eye image. In this case, video signal generator 74 controls DMDs 34, 36, 38 to display the same type of subframes at the time when frames are switched, in order to eliminate the need to change a location at which video image is displayed on screen 200. As an example, if a first subframe (or a second subframe) is displayed immediately before frames are switched, a first subframe (or a second subframe) for a different viewpoint image is displayed immediately after the frames have been switched. In other words, piezoelectric element driver 72 does not drive piezoelectric elements 88, 89 at the time when frames are switched.

Controller 70 generates a synchronization signal used to drive liquid crystal shutter glasses 103. The synchronization signal is at the High level during the display of the N-th frame for the left-eye image and is at the Low level during the display of the N-th frame for the right-eye image. When the synchronization signal is at the High level, the liquid crystal shutter glasses set its left-eye liquid crystal glass to a light transmission state and its right-eye liquid crystal glass to a light shielding state, in response to the synchronization signal. As a result, the viewer can observe the left-eye image with his/her left eye. When the synchronization signal is at the Low level, the liquid crystal shutter glasses set the left-eye liquid crystal glass to the light shielding state and the right-eye liquid crystal glass to the light transmission state. As a result, the viewer can observe the right-eye image with his/her right eye.

As described above, video signal generator 74 and controller 70 set a frequency at which a displayed location of the video image on screen 200 is changed to be the same as a frequency at which liquid crystal shutter glasses 103 switch the light shielding state between the left side and the right side, with their phase difference controlled to be 90 degrees.

Figure 12:
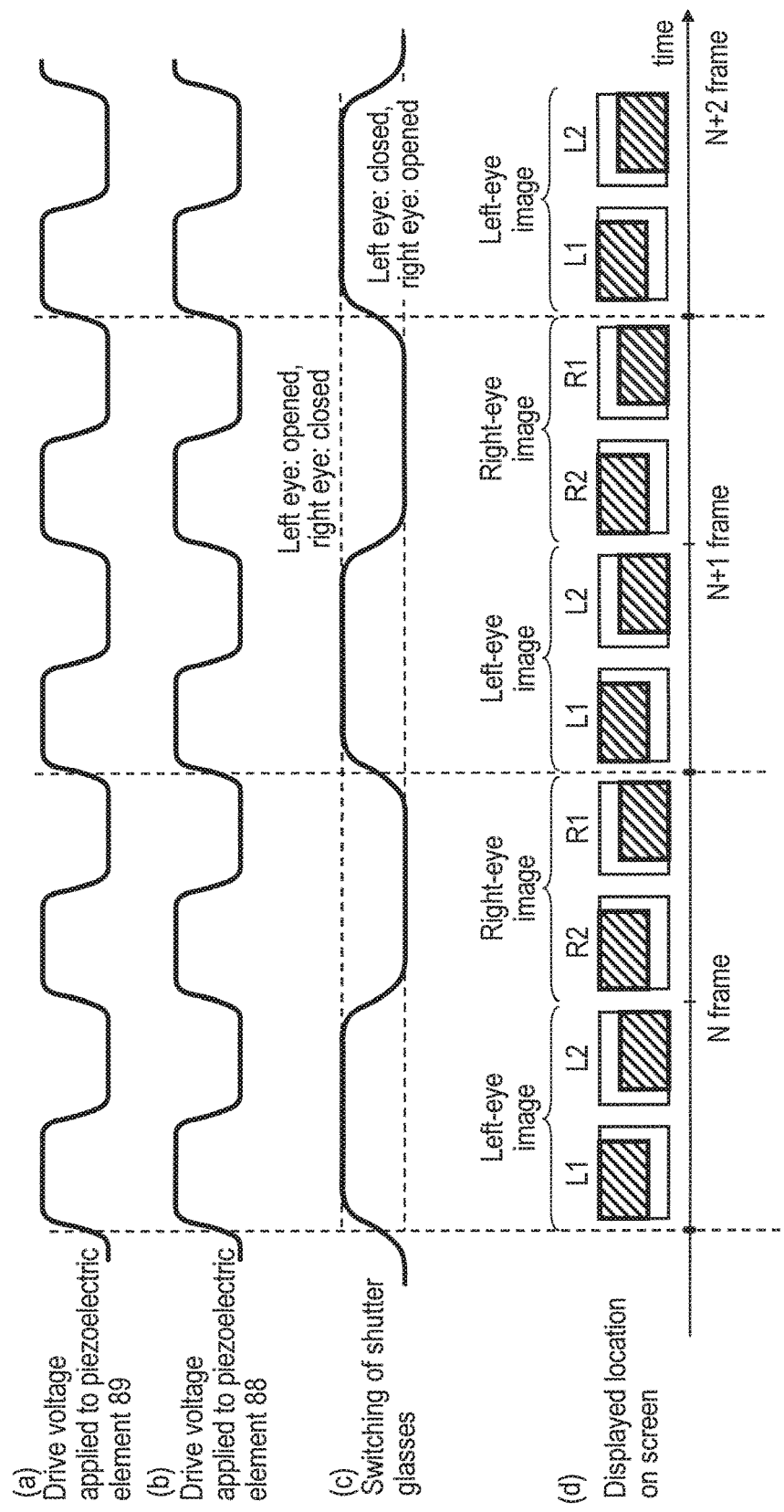
FIG. 12 is a diagram illustrating exemplary waveforms of drive voltages applied to the piezoelectric elements.

FIG. 12 illustrates waveforms of drive voltages applied to piezoelectric elements 88, 89 when piezoelectric elements 88, 89 are driven every time a first subframe and a second subframe are switched. In a method for driving piezoelectric elements 88, 89 in order to display video of an N-th frame as illustrated in FIG. 12, the videos of first subframe L1 for the left-eye image, second subframe L2 for the left-eye image, second subframe R2 for the right-eye image, and first subframe R1 for the right-eye image are displayed in this order. This driving method involves changing a displayed location at a higher frequency than the driving method in this exemplary embodiment illustrated in FIG. 11.

The driving method in this exemplary embodiment as illustrated in FIG. 11 can reduce a frequency at which piezoelectric elements 88, 89 are driven to a half that at which piezoelectric elements 88, 89 are driven every time the first subframe and the second subframe are switched as illustrated in FIG. 12. When a piezoelectric element is driven at a high speed, the piezoelectric element may make loud noise. So, by driving piezoelectric elements at a low frequency, noise made by the driving of the piezoelectric elements can be reduced. In addition, the quality of the resultant video can be maintained.

The piezoelectric elements are driven at the same frequency both in the 3D video display mode as illustrated in FIG. 11 and in the normal mode as illustrated in FIG. 8. This can suppress mode-dependent variation in noise.

Figure 13:
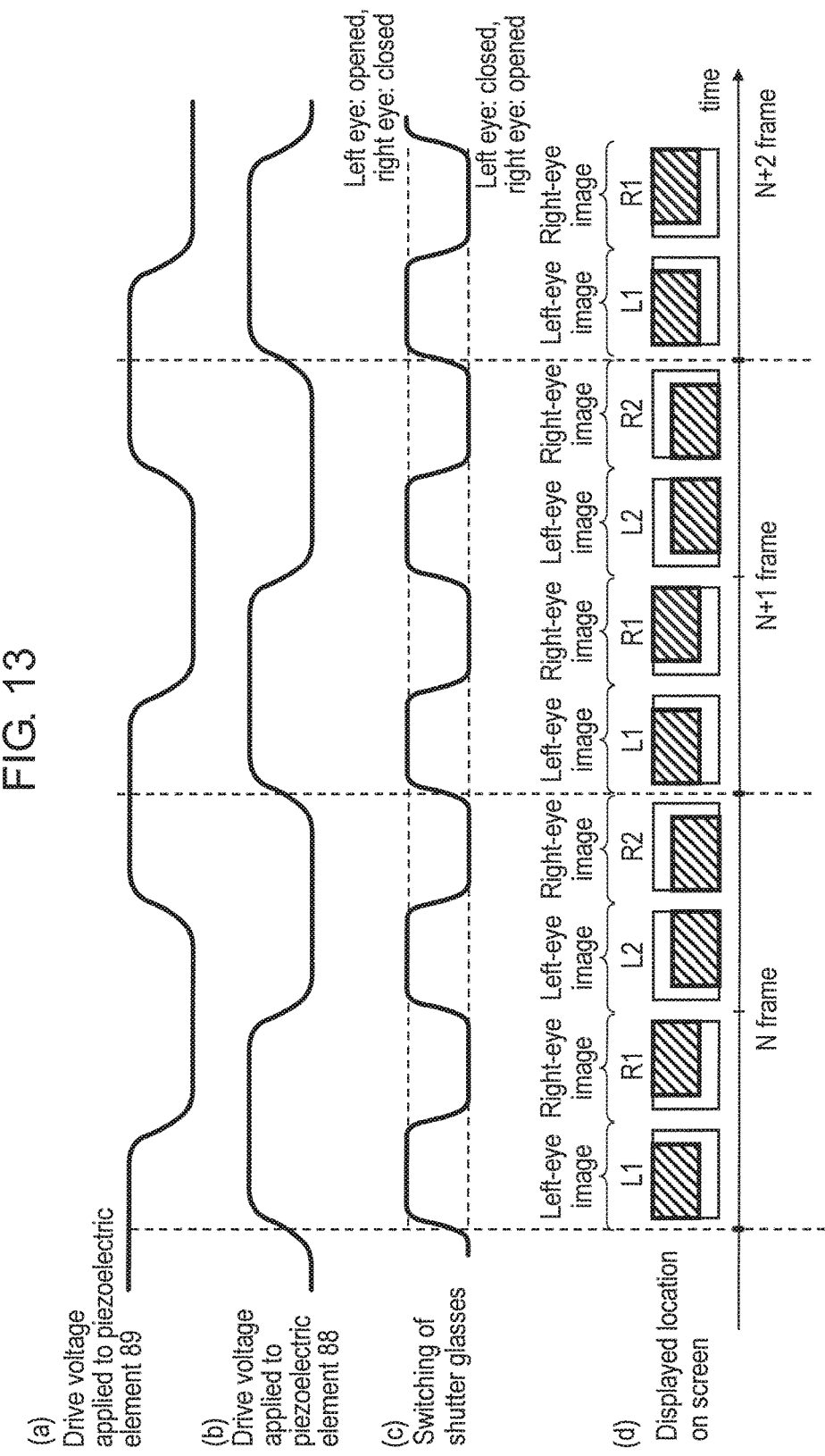
FIG. 13 is a diagram illustrating other exemplary waveforms of drive voltages applied to the piezoelectric elements.

FIG. 13 illustrates waveforms of drive voltages applied to piezoelectric elements 88, 89 when piezoelectric elements 88, 89 are driven alternately every time a first subframe and a second subframe are switched. In FIG. 13, the videos of first subframe L1 for the left-eye image, first subframe R1 for the right-eye image, second subframe L2 for the left-eye image, and second subframe R2 for the right-eye image are displayed in this order.

The driving method in this exemplary embodiment as illustrated in FIG. 11 can reduce a frequency at which liquid crystal shutter glasses 103 are driven to a half that of the driving method illustrated in FIG. 13. This can cause liquid crystal shutter glasses 103 to switch the light shielding state between the left side and the right side at a low frequency, thereby reducing a crosstalk, which is an incident in which the left video and the right video simultaneously appear when the left video and the right video are switched. To suppress crosstalk which is attributed to the switching, both of the left and the right sides of liquid crystal shutter glasses 103 may be temporarily set to the light shielding state at the same time. In this case, the driving method in this exemplary embodiment can shorten a time over which both the sides are set to the light shielding state for each frame. This can reduce the risk of the resultant video being darkened.

As described above, controller 70 controls video generator 20 in the following manner. First, controller 70 generates viewpoint images for 3D video, namely, a left-eye video signal and a right-eye video signal, from a video input signal. Then, controller 70 spatially splits signals indicating frames in each of the left-eye video signal and the right-eye video signal, thereby generating multiple types of signals indicating subframes. Furthermore, controller 70 controls optical path changer 80 so as to keep a location at which video image is displayed on a projection surface before and after the time when a subframe for the left-eye video signal is switched to a subframe for the right-eye video signal. In this case, controller 70 controls video generator 20 such that, when a first frame is switched to a second frame, the last subframe in the first frame and the first subframe in the second frame have the same type and are related to different viewpoint images. As an example, if the last subframe in an N-th frame to be displayed is first subframe R1 for the right-eye image, the first subframe in the (N+1)-th frame to be displayed at the next time to the N-th frame is first subframe L1 in the (N+1)-th frame for the left-eye image. In this example, both the subframes are related to different viewpoint images, more specifically the last subframe in the N-th frame is related to a right-eye image, and the first subframe in the (N+1)-th frame is related to a left-eye image. In addition, both the subframes have the same subframe type, more specifically are the first subframe. Since both the subframes have the same subframe type, these subframes are displayed on screen 200 at the same location before and after the time when the N-th frame is switched to the (N+1)-th frame.

1-5. 3D Video Process

A description will be given of a process of video to be input to video signal generator 74.

1-5-1. Quadruple Density Video

Each of the left-eye video and the right-eye video has a resolution which is the four times that of each DMD. Video signal generator 74 generates a video output signal indicating a first subframe from the upper left pixels in blocks in a video input signal for each viewpoint video; each block contains 4 (2×2) pixels. Likewise, video signal generator 74 generates a video output signal indicating a second subframe from the lower right pixels in the blocks.

In the above case, the upper right pixel and the lower left pixel in each block are not used. Therefore, pixels may be lacked at corresponding points between the left video and the right video. For example, the pixel in the left-eye video at the coordinates (A0, B0) and the pixel in the right-eye video at the coordinates (A1, B1) are designated as corresponding points in the 3D video. The pixel in the left-eye video at the coordinates (A0, B0) corresponds to the upper left pixel in a block; the pixel in the left-eye video at the coordinates (A1, B1) corresponds to the upper right pixel in the block. In this case, the pixel in the left-eye video at the coordinates (A0, B0) is displayed as the video of the first subframe, but the pixel in the right-eye video at the coordinates (A1, B1) is not displayed in the subframes. Thus, the left video and the right video are not combined together within a region in which no corresponding points are present, in which case the viewer may feel that the resultant video looks strange.

To prevent the above disadvantage, a video signal generator may add pixel information regarding upper right pixels and lower left pixels not to be used to pixel information regarding upper left pixels and lower right pixels to be used. Before adding the pixel information, video signal generator may disperse the pixel information by processing input quadruple density video with a low-pass filter.

Alternatively, pixel information regarding upper right pixels and lower left pixels not to be used may be added in advance to pixel information regarding upper left pixels and lower right pixels to be used, and then the resultant pixel information may be input to video signal generator 74.

1-5-2. Double Density Video 1

Each of the right-eye video and the left-eye video has a resolution which is the twice that of each DMD. A video signal generator uses an entire input video to generate a first subframe and a second subframe.

The video signal generator may generate double density video by using CG (computer graphics).

To generate frame video, first, the video signal generator stops time on the CG.

Then, the video signal generator generates a first subframe for a left eye with its resolution being the same as that of each DMD. Here, the location of the viewpoint is referred to as the first viewpoint location, and the location of the projection surface is referred to as the first projection location. Then, the video signal generator generates a second subframe for a left eye with its resolution being the same as that of each DMD. In this case, the viewpoint is maintained at the first viewpoint location, but the projection surface is shifted rightward by a half of the pixel length and downward by a half of the pixel length from the viewpoint location. Here, the location of the projection surface is referred to as the second projection location. Continuing, the video signal generator generates a first subframe for a right eye with its resolution being the same as that of each DMD. Here, the location of the viewpoint is referred to as the second viewpoint location. The projection surface is positioned at the first projection location. Finally, the video signal generator generates a second subframe for a right eye with its resolution being the same as that of each DMD. In this case, the viewpoint is maintained at the second viewpoint location, but the projection surface is positioned at the second projection location.

1-5-3. Double Density Video 2

Each of the right-eye video and the left-eye video has a resolution which is the twice that of each DMD. A video signal generator uses an entire input video to generate a first subframe and a second subframe.

The video signal generator may generate double density video by using computer graphics (CG).

At a first timing, the video signal generator generates a first subframe for a left eye with its resolution being the same as each DMD. Here, the location of the viewpoint is referred to as the first viewpoint location, and the location of the projection surface is referred to as the first projection location. Then, at a second timing when a predetermined time has elapsed on the CG, the video signal generator generates a second subframe for a left eye with its resolution being the same as each DMD. In this case, the viewpoint is maintained at the first viewpoint location, but the location of the projection surface is shifted rightward by a half of the pixel length and downward by a half of the pixel length with respect to the viewpoint location. Here, the location of the projection surface is referred to as the second projection location. Continuing, at a third timing when a predetermined time has further elapsed on the CG, the video signal generator generates a second subframe for a right eye with its resolution being the same as each DMD. In this case, the location of the viewpoint is referred to as the second viewpoint location. The projection surface is maintained at the second projection location without changing the location. Finally, at a fourth timing when a predetermined time has elapsed on the CG, the video signal generator generates a first subframe for a right eye with its resolution being the same as each DMD. In this case, the viewpoint is maintained at the second viewpoint location, but the projection surface is positioned at the first projection location.

The video signal generator generates subframe video signals for a left-eye video and a right-eye video in the above manner, and then a video display of the present disclosure displays a 3D video. In this way, it is possible to display time-compensated video, as opposed to double density video 1.

1-6. Function and Effect

As described above, projection video display 100 includes video generator 20, optical guiding system 50, projection optical system 60, and optical path changer 80. Video generator 20 generates video image. Both optical guiding system 50 and projection optical system 60 project the video image onto screen 200. Optical path changer 80 is disposed in the optical path of the video image and changes a location at which the video image is displayed on screen 200. Projection video display 100 further includes liquid crystal shutter glasses 103 and controller 70. Liquid crystal shutter glasses 103 switch a light shielding state between its left side and right side. Controller 70 controls video generator 20, optical path changer 80, and liquid crystal shutter glasses 103, based on a video input signal. Controller 70 spatially splits signals indicating frames in each of video input signals for a left eye and a right eye, and then generates signals indicating multiple types of subframes. Controller 70 controls optical path changer 80 so as to maintain a location at which the video image is displayed on screen 200 before and after the time when frames in the video signals for a left eye and a right eye are switched. Moreover, controller 70 controls video generator 20 so that, when a first frame is switched to a second frame, the last subframe in the first frame and the first subframe in the second frame have the same type (first/second subframe) and are related to different viewpoint videos.

The video signal generator 74 and the controller 70 control piezoelectric elements 88, 89, which are used to change a location at which the video image is displayed on screen 200, and liquid crystal shutter glasses 103, such that a driving frequency of piezoelectric element 88, 89 coincides a driving frequency at which liquid crystal shutter glasses 103 switch a light shielding state between the left side and the right side. Furthermore, a phase difference between a drive waveform of piezoelectric elements 88, 89 and a drive waveform of liquid crystal shutter glasses 103 are set to 90 degrees.

The above configuration can cause the optical path of the video image to be changed at a low frequency, thereby maintaining a quality of video. Thus, this configuration is effective in improving reliability of piezoelectric elements and reducing making of noise. In addition, the configuration can cause liquid crystal shutter glasses 103 to switch a light shielding state between its left side and right side at a low frequency, thereby effectively reducing an occurrence of a crosstalk and suppressing resultant video from being darkened.

Second Exemplary Embodiment

A projection video display in a second exemplary embodiment basically has substantially the same configuration as the projection video display in the first exemplary embodiment, but their methods for controlling a shift of a displayed location differ from each other.

Figure 14:
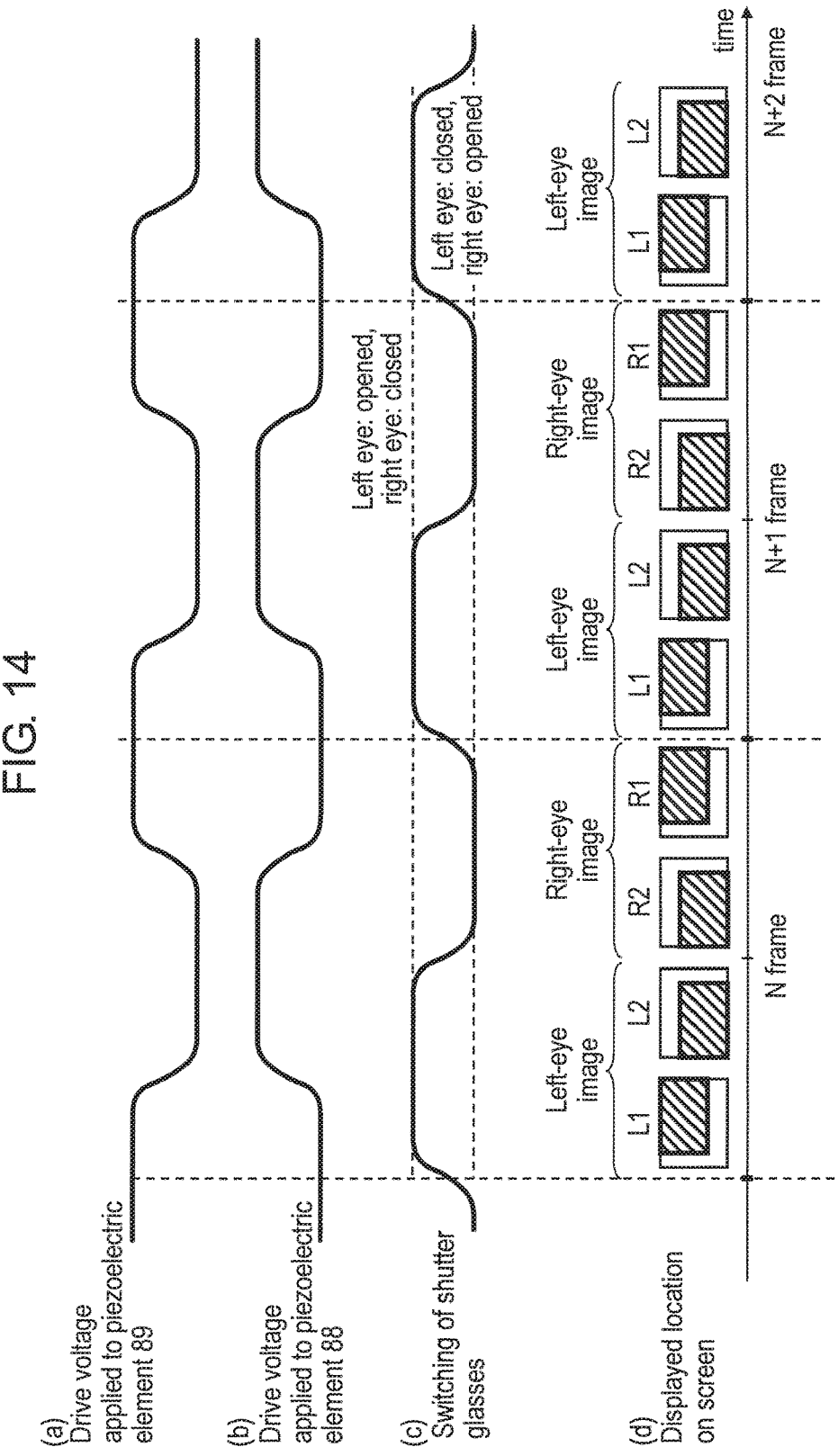
FIG. 14 is a diagram illustrating waveforms of drive voltages applied to the piezoelectric elements in a second exemplary embodiment.

In a 3D video display mode, the projection video display in the second exemplary embodiment shifts its displayed location in a different direction at regular intervals. FIG. 11 illustrates an exemplary control over which images are projected onto a screen at an upper left location and at a lower right location. FIG. 14 illustrates an exemplary control over which images are projected onto a screen at an upper right location and at a lower left location. In this case, a phase difference between drive waveforms of piezoelectric elements 88, 89 is set to 180 degrees.

In this exemplary embodiment, every time the normal mode is switched to a 3D video display mode, the projection video display switches between the control over which images are projected at an upper left location and at a lower right location and the control over which images are projected at an upper right location and at a lower left location. Switching the driving method in this manner causes the mechanism to move in different directions. Consequently, it is possible to prevent the mechanism from deteriorating unevenly, enabling optical path changer 80 to operate stably in the normal mode.

Video signal generator 74 uses different pixels to generate subframes. Under the control over which an image is projected onto a screen at an upper left location and at a lower right location, video signal generator 74 generates a first subframe video from upper left pixels and a second subframe video from lower right pixels. Under the control over which an image is projected onto a screen at an upper right location and at a lower left location, video signal generator 74 generates a first subframe video from upper right pixels and a second subframe video from lower left pixels.

Third Exemplary Embodiment

A projection video display in a third exemplary embodiment has substantially the same configuration as the projection video displays described in the first and second exemplary embodiments. A description will be given, especially regarding a video input signal and video signals indicating subframes (referred to below as subframe signals).

FIG. 19, FIG. 20, FIG. 21, FIG. 22, FIG. 24 each illustrate a relationship between subframe signals and signals indicating pixels in blocks in frames of a video input signal. For example, signal L00_1 is related to the upper left pixel in each block in the video input signal indicating an (N+1)-th frame illustrated in FIG. 19. Likewise, signal L10_1 is related to the upper right pixel in each block. Signal L11_1 is related to the lower right pixel in each block. Signal L01_1 is related to the lower left pixel in each block. Signal L00_2 is related to the upper left pixel in each block in the video input signal indicating an (N+2)-th frame illustrated in FIG. 19. Video generator 20 outputs signal L00_1 as a subframe signal indicating a first subframe illustrated in FIG. 19. Likewise, video generator 20 outputs signal L10_1 as a subframe signal indicating a second subframe. Video generator 20 outputs signal L11_1 as a subframe signal indicating a third subframe. Video generator 20 outputs signal L01_1 as a subframe signal indicating a fourth subframe. In this case, video generator 20 outputs subframe signal L00_1 indicating the first subframe, subframe signal L10_1 indicating the second subframe, subframe signal L01_1 indicating the fourth subframe, and subframe signal L11_1 indicating the third subframe in this order in accordance with the temporal axis illustrated in FIG. 19.

Figure 20:
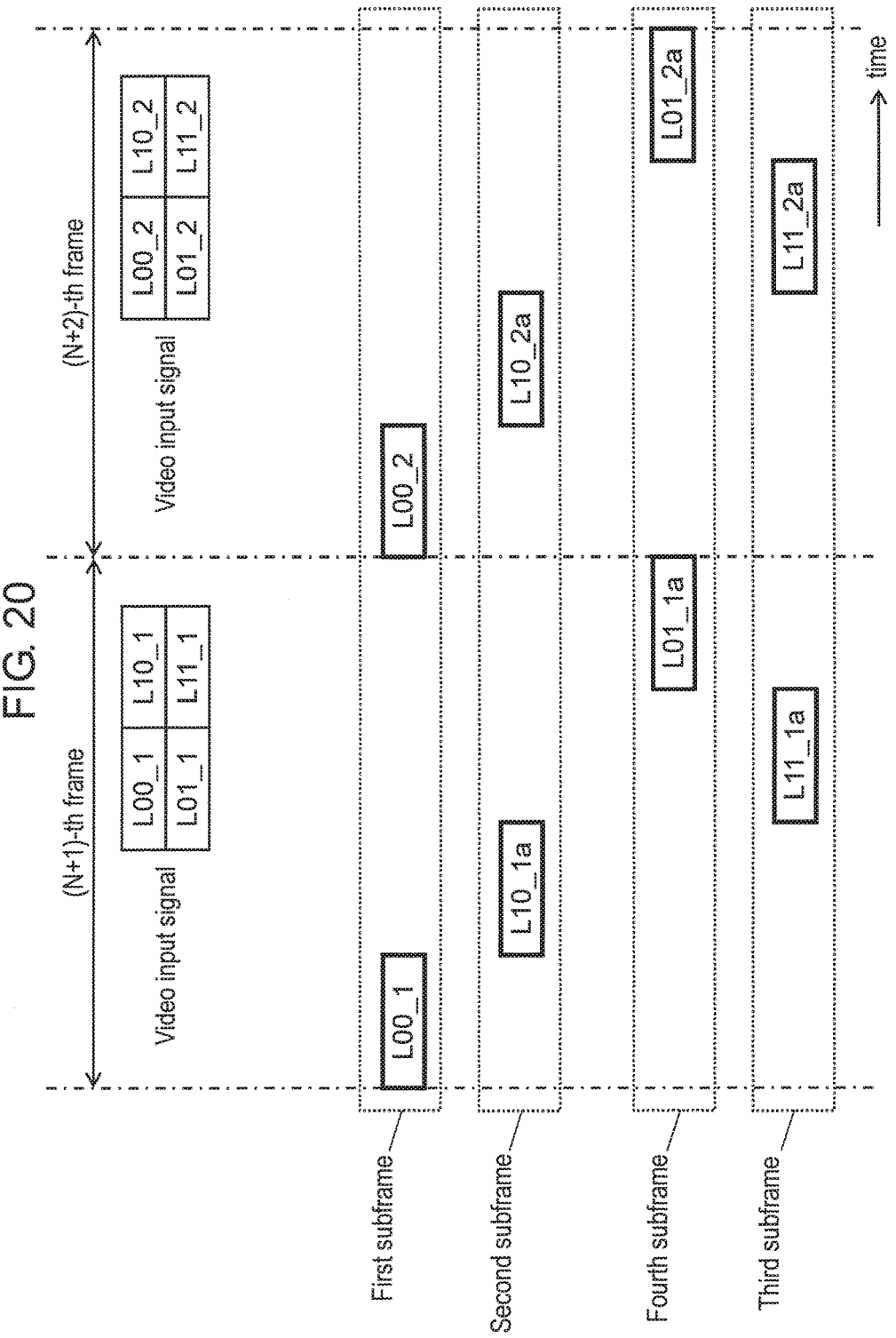
FIG. 20 is a diagram illustrating a relationship between a video input signal and a subframe signal.

Exemplary subframe signals according to the third exemplary embodiment will be described with reference to FIG. 20. As illustrated in FIG. 20, video generator 20 generates a subframe signal by making interpolation based on video input signals indicating two successive frames and then outputs this subframe signal. In FIG. 20, video generator 20 outputs signal L00_1 related to the upper left pixel in each block in the video input signal, as a subframe signal indicating the first subframe. Then, video generator 20 generates signal L10_1a by making interpolation based on a video input signal L10_1 indicating an (N+1)-th frame and a video input signal L10_2 indicating an (N+2)-th frame, and outputs the signal L10_1a as a subframe signal indicating a second subframe in the (N+1)-th frame. Likewise, video generator 20 generates signal L11_1a by making interpolation based on signals L11_1 and L11_2 and then outputs signal L11_1a as a subframe signal indicating a fourth subframe. Video generator 20 generates signal L01_1a by making interpolation based on signals L01_1 and L01_2 and then outputs signal L01_1a as a subframe signal indicating a third subframe. In the third exemplary embodiment, video generator 20 outputs these subframe signals at different timings on a time-series basis. In the configuration illustrated in FIG. 19, the subframes for the (N+1)-th frame are signals corresponding to the same timing of the video input signal. In this case, if timing at which the subframes are displayed on screen 200 does not match the timing of the video signal, a viewer may feel something strange. The configuration in the third embodiment causes subframe images in the same frame to be displayed at different timings, suppressing the viewer from feeling something strange.

The interpolation made by video generator 20 may be weighted interpolation in which different weights are added to successive frames based on the timing at which subframes are projected onto screen 200. For example, the timing at which the subframe signal L10_1 indicating the second subframe in the (N+1)-th frame is output is closer to the timing at which the subframe signal L00_1 indicating the first subframe in the (N+1)-th frame is output than the timing at which the subframe signal L00_2 indicating the first subframe in the (N+2)-th frame is output. Thus, video generator 20 generates subframe signal L10_1a by making interpolation in which a heavier weight is added to the subframe signal L10_1 and a lighter weight is added to the subframe signal L10_2. In this case, the ratio of a first timing difference to a second timing difference is set to 1:3; the first timing difference is defined as the difference between the timing at which subframe signal L00_1 is output and the timing at which subframe signal L10_1a is output, and the second timing difference is defined as the difference between the timing at which subframe signal L10_1a is output and the timing at which subframe signal L00_2. In this way, the ratio of the weight added to subframe signal L10_1 to the weight added to subframe signal L10_2 is preferably set to 3:1. By making the interpolation in which weights based on the difference between the displayed timings are added to subframe signals, it is possible to reduce the risk of the viewer feeling something strange.

Figure 21:
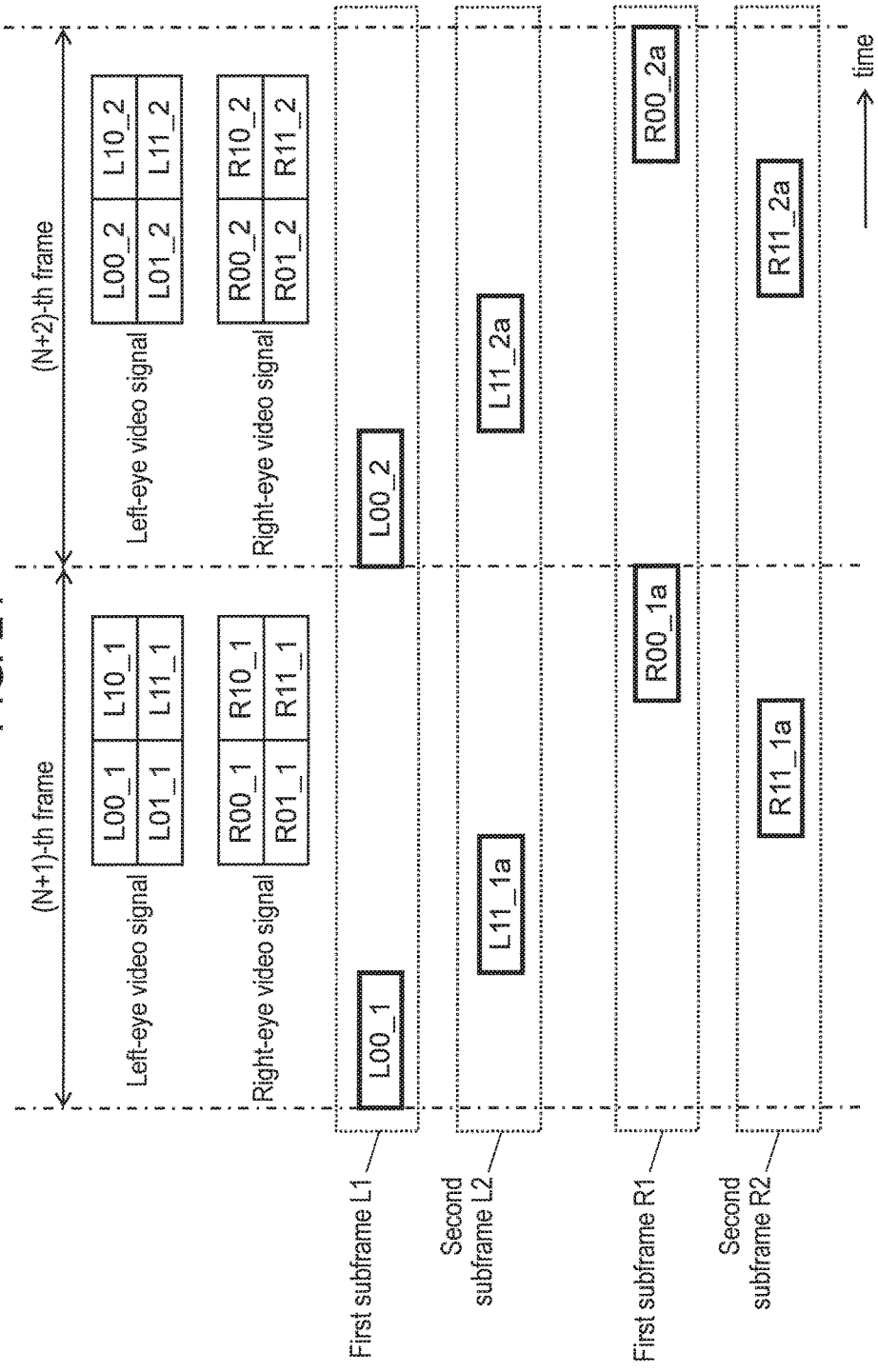
FIG. 21 is a diagram illustrating a relationship between a video input signal and a subframe signal.

Exemplary subframe signals according to the third exemplary embodiment will be described with reference to FIG. 21. In the configuration illustrated in FIG. 21, each video input signal contains a left-eye video signal and a right-eye video signal. Video generator 20 generates first subframe L1 related to the upper left pixel in each block and second subframe L2 related to the lower right pixel in each block, based on the left-eye video signal. Likewise, video generator 20 generates first subframe R1 related to the upper left pixel in each block and second subframe R2 related to the lower right pixel in each block, based on the right-eye video signal. Similar to the generation of the subframe signals using interpolation as illustrated in FIG. 20, video generator 20 generates the second subframe L2 for the left-eye video, the second subframe R2 for the right-eye video, and the first subframe R1 for the right-eye video through interpolation using video input signals indicating two successive frames. Generating subframe signals in this manner can reduce the risk of the viewer feeling something strange at a displayed timing.

Video generator 20 may further use a spatial correction. For example, video generator 20 may correct subframe signal L00_1 indicating first subframe L1 by referring to video signal L01_1 related to the pixel on the under side and video signal L10_1 related to the pixel on the right side. Subsequently, video generator 20 may correct second subframe L2, first subframe R1, and second subframe R2 in the same manner. In this case, video generator 20 generates subframe signals by making interpolation based on a video signal acquired through the interpolation of a video input signal. Combining temporal interpolation and spatial correction in this manner enables the viewer to perceive the video as being in higher resolution when a viewer watches video projected onto screen 200 and reduces the risk of the viewer feeling something strange at a displayed timing.

Exemplary subframe signals according to the third exemplary embodiment will be described with reference to FIG. 22. Video generator 20 illustrated in FIG. 22 generates video at a higher frame rate than a video input signal. More specifically, video generator 20 generates subframe signals for an (N+1)-th frame by making interpolation using a video input signal indicating the (N+1)-th frame and a video input signal indicating an (N+2)-th frame (not illustrated). For example, video generator 20 generates subframe signal L00_1b indicating first subframe L1 by making interpolation using the subframe signals L00_1 and L00_2 (not illustrated). Video generator 20 outputs two subframe signals L00_1 and L00_1b indicating first subframe L1 within the period of the (N+1)-th frame. Likewise, video generator 20 generates and outputs subframe signals indicating second subframe L2, first subframe R1, and second subframe R2. In this way, video generator 20 can output a signal at a higher frame rate than the video input signal. Consequently, projection video display 100 can project video onto screen 200 at high time-resolution, thereby enabling the viewer to perceive the video as being of higher quality and reducing the risk of the viewer feeling something strange at a displayed timing.

Figure 22:
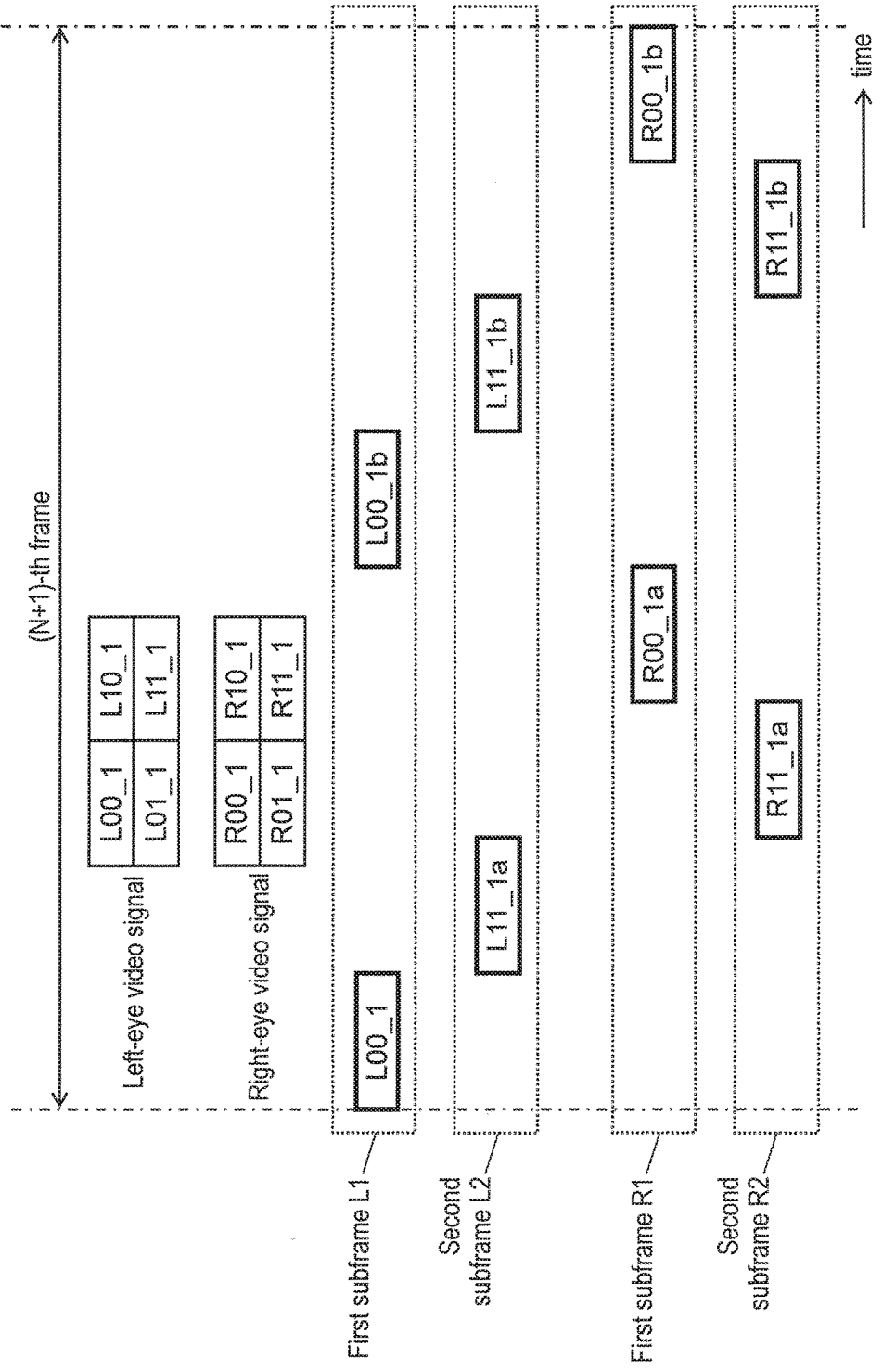
FIG. 22 is a diagram illustrating a relationship between a video input signal and a subframe signal.

In FIG. 22, the video input signal contains the left-eye video signal and the right-eye video signal. However, projection video display 100 can also output a signal at a higher frame rate even when displaying 2D video as in the case of FIG. 20.

Figure 23:
FIG. 23 is an illustrative diagram of the combination of a right-eye video signal and a left-eye video signal.
Figure 24:
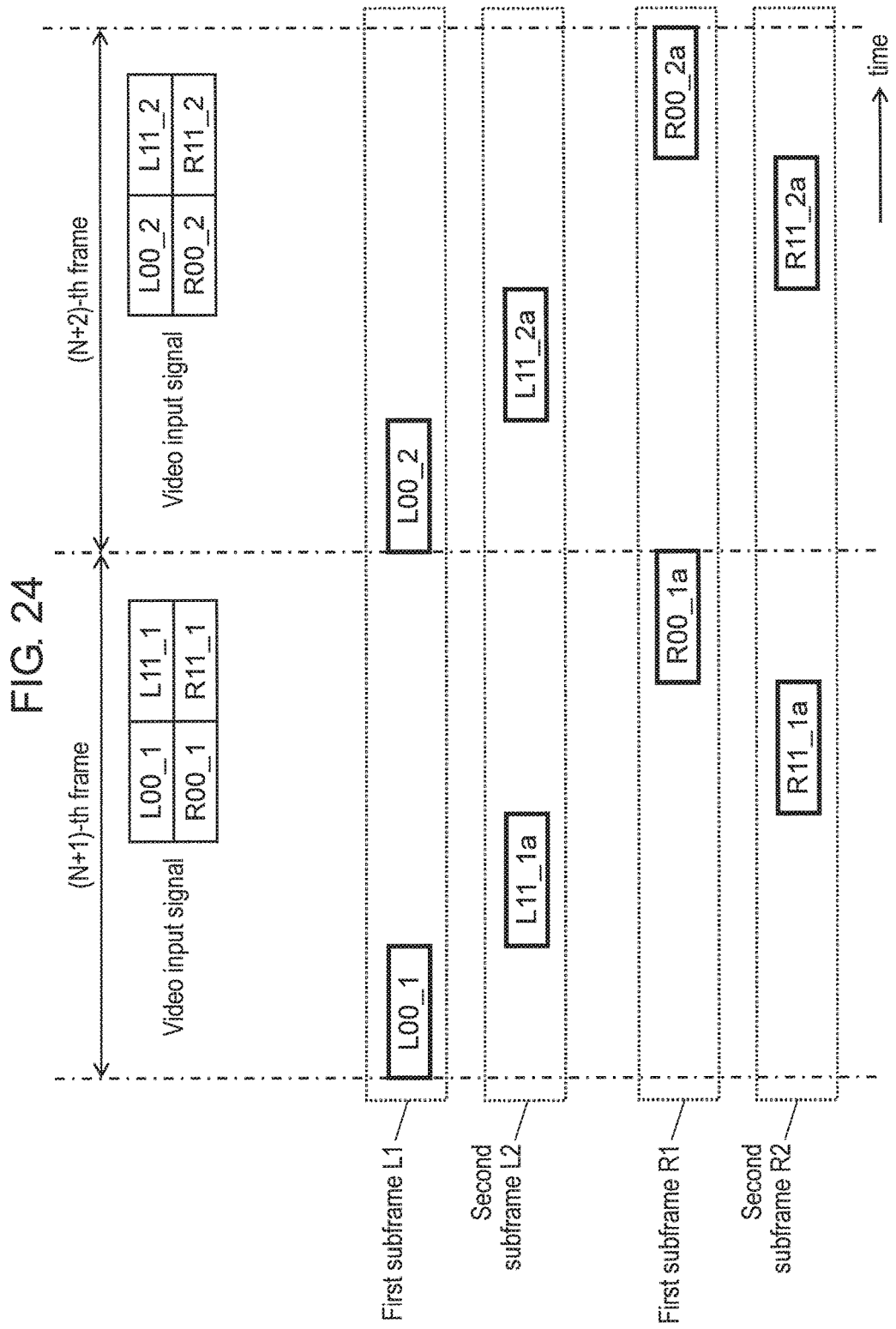
FIG. 24 is a diagram illustrating a relationship between a video input signal and a subframe signal.

Exemplary subframe signals according to the third exemplary embodiment will be described with reference to FIG. 23 and FIG. 24. As illustrated in FIG. 24, video generator 20 receives video input signals in each of which a left-eye video signal and a right-eye video signal are combined together. Each video input signal contains the combination of the left-eye video signal and the right-eye video signal, as illustrated in FIG. 23. In FIG. 23, video signal L00 is generated by extracting only signals related to the upper left pixels in blocks of the left-eye video signal. Likewise, video signal L11 is generated by extracting only signals related to the lower right pixels in blocks of the left-eye video signal. This scheme is also applied to the right-eye video signal. The video input signal contains the combination of video signals L00, L11, R00, and R11. In a vertical direction, the resolution of each of video signals L00, L11, R00, and R11 is a half that of the left-eye video signal and the right-eye video signal. Likewise, in a horizontal direction, the resolution of each of video signals L00, L11, R00, and R11 is a half that of the left-eye video signal and the right-eye video signal. In short, the resolution of each of video signals L00, L11, R00, and R11 is a quarter that of the left-eye video signal and the right-eye video signal. As illustrated in FIG. 24, video generator 20 generates subframe signals, based on the video input signal generated in the above manner. The video input signal illustrated in FIG. 23 and FIG. 24 differs from that in other exemplary embodiments, in that video signals L00, L11, R00, and R11 are arranged spatially separated from one another. This arrangement eliminates the need for video generator 20 to generate video signals individually related to pixels in blocks, each of which contains 4 (2×2) pixels, thereby reducing computing complexity of video generator 20. In which case, information contained in the video input signal to be input to video generator 20, which is a video signal used to display 3D video, is smaller in amount than the video input signal as illustrated in FIG. 21. Thus, using this video input signal leads to reductions in a volume of data traffic and a capacity required to store video data.

Other Exemplary Embodiments

In the foregoing exemplary embodiments, light source 10 is not specified; however, a lamp light source, a solid light source, or more preferably a light source including a laser light source and a fluorescent substance may be used. The configuration of video generator 20 described above is provided with three DMDs; however, this configuration is not limited. Alternatively, a video generator may be provided with a single DMD. Moreover, instead of the DMD(s), a video generator may be provided with a light transmission type or light reflection type of liquid crystal display element as a display element.

In the foregoing exemplary embodiments, piezoelectric elements are used as an actuator that vibrates optical path changer 80; however, this configuration is limited. Alternatively, for example, a VCM (voice coil motor) may be used. Although optical path changer 80 is disposed between video generator 20 and projection optical system 60, optical path changer 80 may be disposed at any midway point between video generator 20 and screen 200. For example, optical path changer 80 may be interposed between lenses in projection optical system 60. The plano-concave lens (lens 86) and the plano-convex lens (lens 87) are disposed in lens unit 85 in this order with reference to video generator 20; however, this configuration is not limited. The two lenses in lens unit 85 may be disposed in any fashion so as to cancel their refractive indices. Alternatively, for example, the piano-convex lens (lens 87) and the plano-concave lens (lens 86) may be disposed in this order with reference to video generator 20.

In the foregoing exemplary embodiments, a signal indicating upper left pixels is set as a first subframe and a signal indicating lower right pixels is set as a second subframe in order to display double density video; however, a configuration of subframes is not limited. Alternatively, for example, a signal indicating upper right pixels may be set as a first subframe and a signal indicating lower left pixels may be set as a second subframe. In this case, an optical path changer may control an optical path of video image such that a location at which the video image is displayed on a projection surface moves in an upper right direction and in a lower left direction in accordance with a location of a pixel to be sampled.

In the foregoing exemplary embodiments, when video signal generator generates video signals indicating subframes, a signal indicating the upper left pixel in each block is set as a first subframe; however, this configuration is not limited. Alternatively, a signal indicating a pixel disposed at another location may be set as a first subframe. Moreover, an interpolation signal between pixels may be generated and set as a first subframe.

Figure 15:
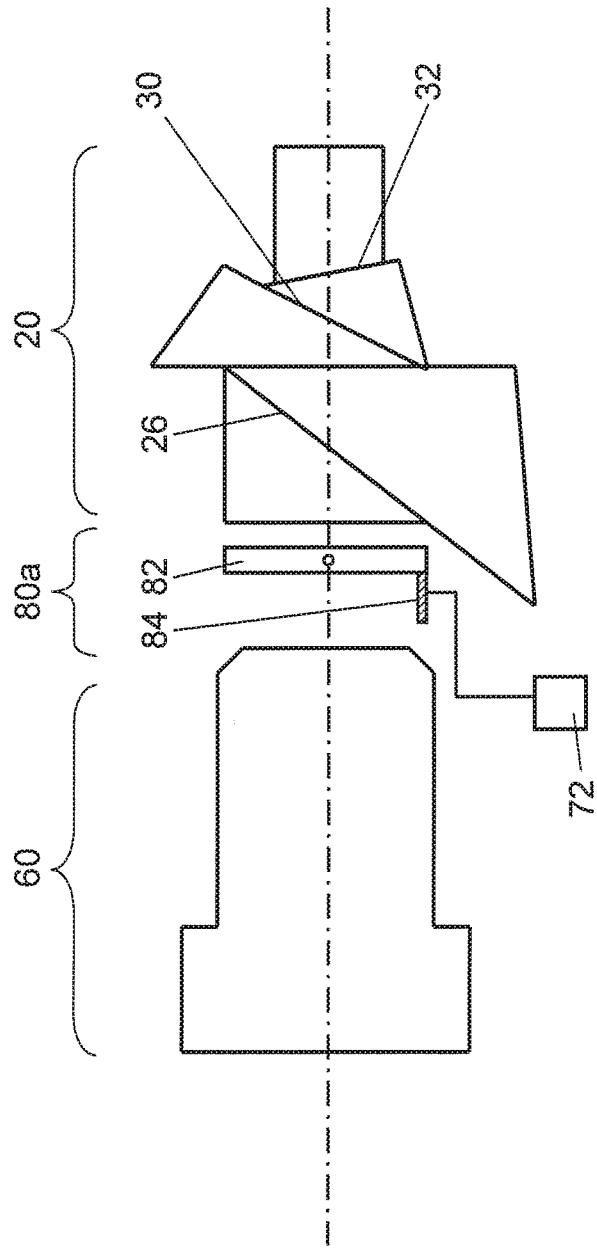
FIG. 15 is a diagram illustrating an optical path changer made of a glass plate member.

In the foregoing exemplary embodiments, as illustrated in FIG. 4 and FIG. 5, an optical path of video image is changed by shifting lens 87 in two axial directions (X and Y directions); however, a configuration of an optical path changer is not limited. For example, an optical path changer may be made of a flat glass member. FIG. 15 illustrates an exemplary configuration of this optical path changer. An optical path changer 80a includes glass member 82 and piezoelectric element 84; glass member 82 refracts an optical path of video image from video generator 20 by means of its varying refractive index, and piezoelectric element 84 varies an angle at which glass member 82 is disposed. When an angle at which glass member 82 is disposed is varied, a location at which light is emitted is shifted due to a refractive effect. As a result, the video image is displayed on screen 200 at a shifted location. Piezoelectric element 84 is driven by piezoelectric element driver 72. By disposing a plurality of piezoelectric elements, an optical path changer that can shift an optical path in two axial directions may be configured. Piezoelectric element 84 may include another type of actuator. For example, an actuator may have a coil. Optical path changer 80 may include two actuators provided in a glass member at respective locations, and these actuators may shift an optical path in two axial directions. In this way, optical path changer 80 can be configured with a simple structure.

Figure 16:
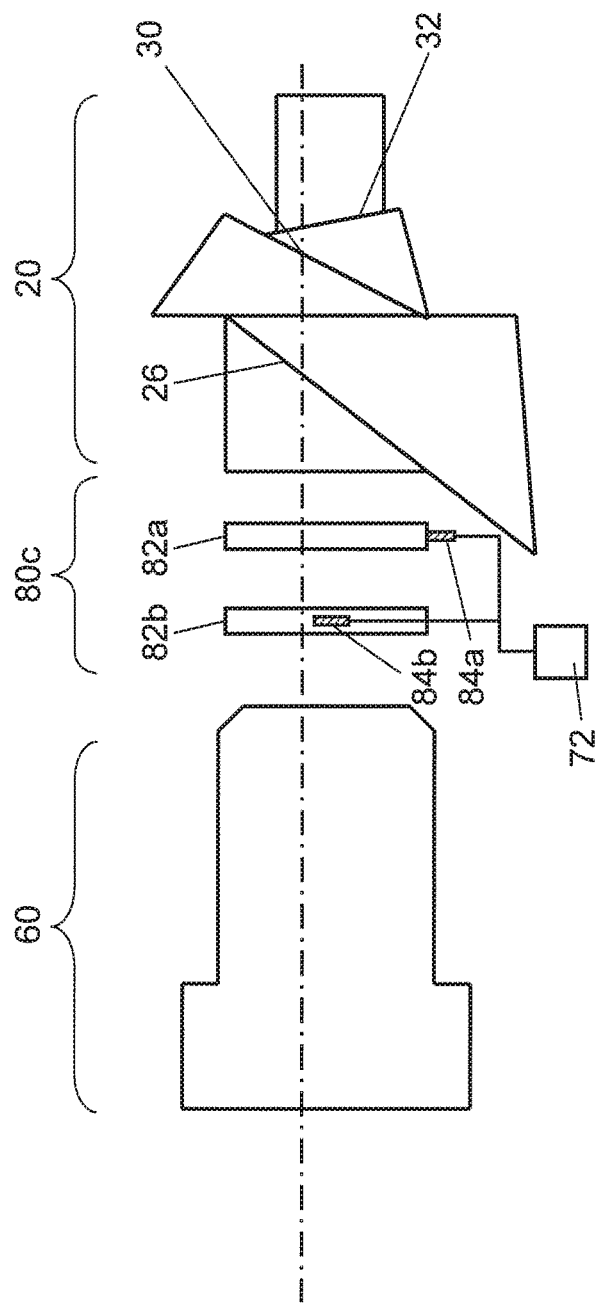
FIG. 16 is a diagram illustrating an optical path changer in which two glass members can shift an optical path in the directions of two axes.

An optical path changer may include a plurality of glass members that can shift an optical path in two axial directions. FIG. 16 illustrates an exemplary configuration of these glass members. An optical path changer 80c includes glass members 82a, 82b and piezoelectric elements 84a, 84b. Each of glass members 82a, 82b refracts an optical path of video image from video generator 20 by means of its varying refractive index. Piezoelectric element 84a varies an angle at which glass member 82a is disposed, and piezoelectric element 84b varies an angle at which glass member 82b is disposed. Glass member 82a shifts locations at which pixels are projected in the Y direction, whereas glass member 82b shifts locations at which pixels are projected in the X direction. Piezoelectric elements 84a, 84b are driven by piezoelectric element driver 72. By combining two glass members 82a, 82b, an optical path can be shifted in the X and Y directions.

Figure 17:
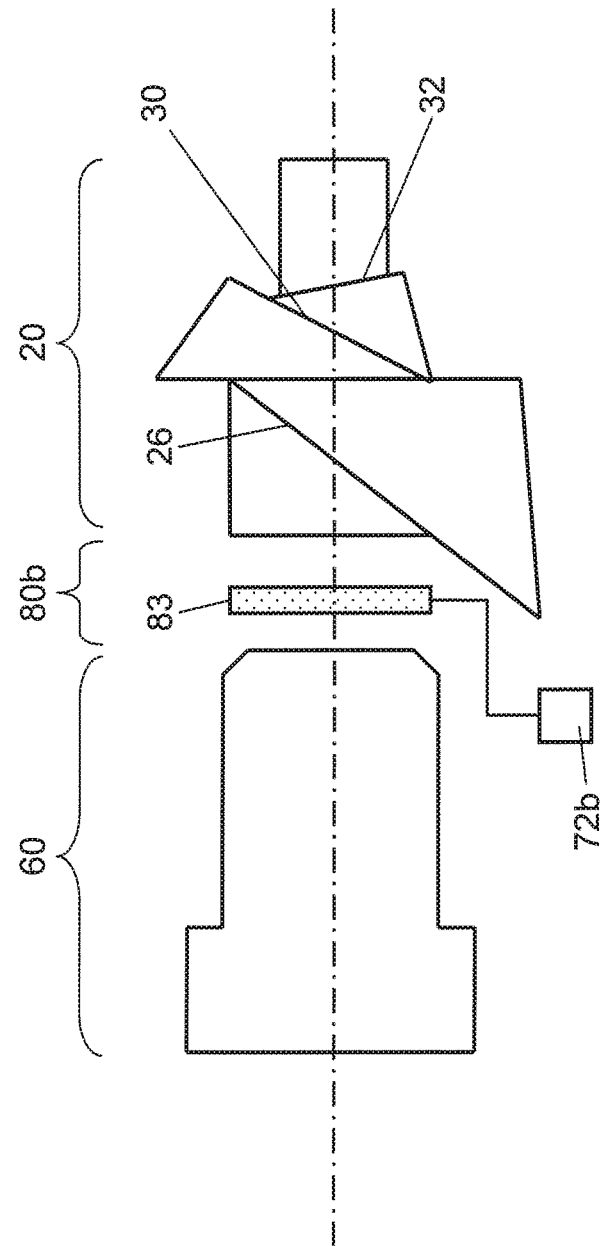
FIG. 17 is a diagram illustrating a configuration of an optical path changer made of a liquid crystal display element.

In the foregoing exemplary embodiments, an optical path changer is made of a lens; however, an optical path changer may be made of a liquid crystal display element. In this case, the liquid crystal display element can shift an optical path by varying its refractive index. FIG. 17 illustrates a configuration of an optical path changer including a liquid crystal display element. Optical path changer 80b includes: liquid crystal display element 83; and drive circuit 72b that drives liquid crystal display element 83. Drive circuit 72b varies a refractive index of a liquid crystal display element by controlling a voltage applied to liquid crystal display element 83, thereby shifting an optical path of the transmitted light in a desired direction. The optical path changer with this configuration can also shift an optical path.

Figure 18:
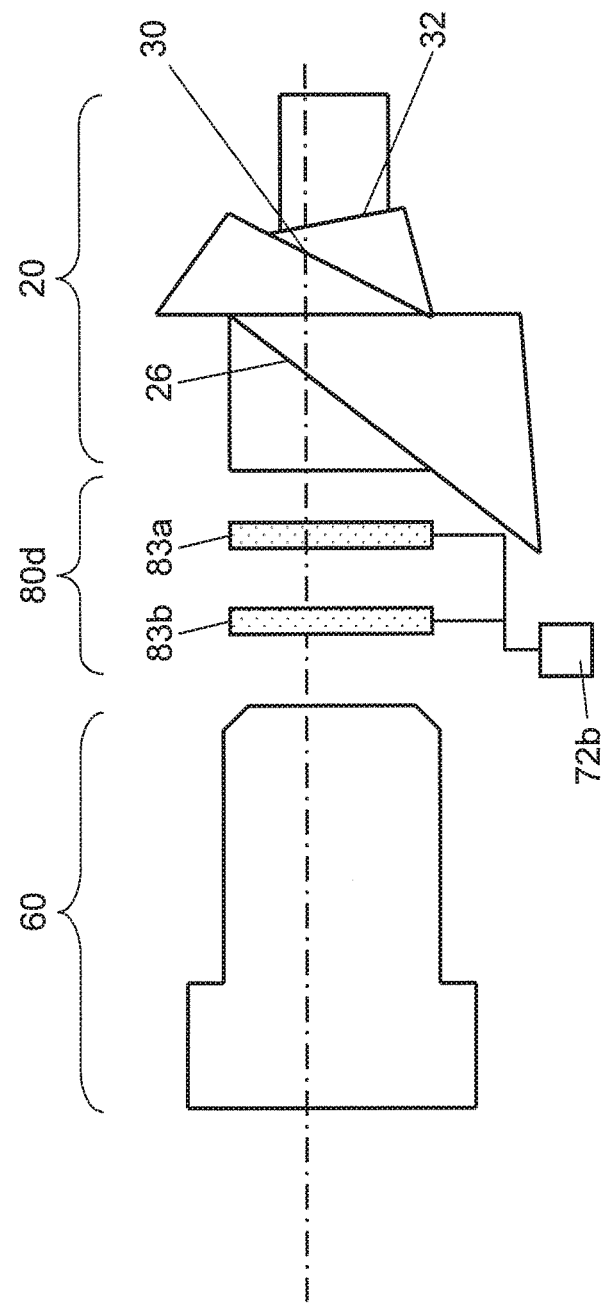
FIG. 18 is a diagram illustrating an optical path changer in which two liquid crystal display elements can shift an optical path in the directions of two axes.
Figure 19:
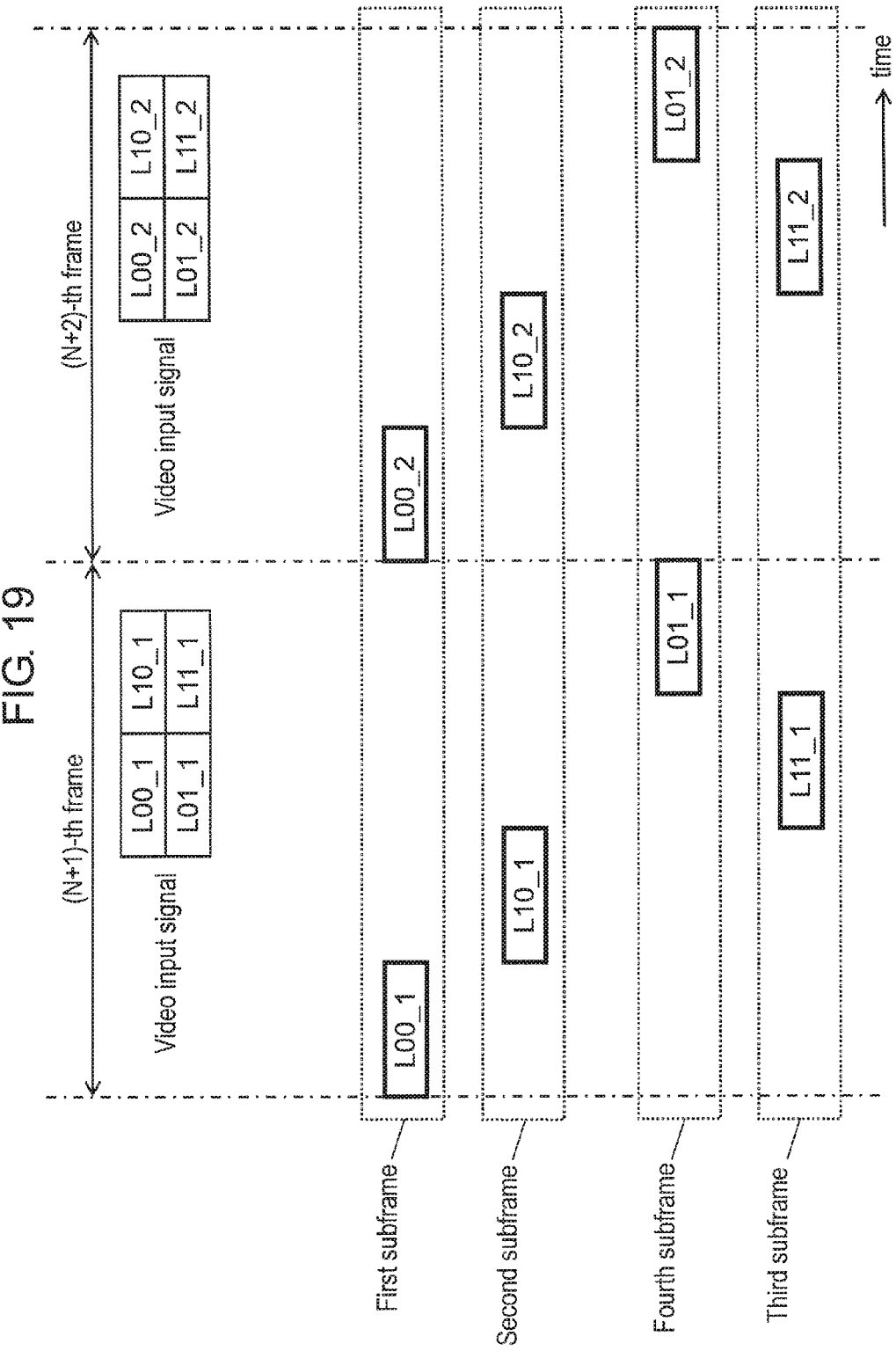
FIG. 19 is a diagram illustrating a relationship between a video input signal and a subframe signal.

An optical path changer may include two liquid crystal display elements that shift an optical path of video image in two axial directions. FIG. 18 illustrates a configuration of an optical path changer that includes two liquid crystal display elements that shift an optical path in two axial directions. Optical path changer 80d includes liquid crystal display element 83a, liquid crystal display element 83b, and drive circuit 72b. Liquid crystal display element 83a shifts the optical path in the Y direction. Liquid crystal display element 83b shifts the optical path in the X direction. Drive circuit 72b drives liquid crystal display elements 83a, 83b.

In the foregoing exemplary embodiments, an optical path changer shifts an optical path along two axes. However, an optical path changer may shift the optical path along a single axis. Even the optical path changer that shifts an optical path along a single axis can also display high-quality 3D video. However, an optical path changer that shifts an optical path along two axes can display video other than 3D video with its resolutions in the vertical and horizontal directions being twice that of each of DMDs 34, 36, 38.

In the foregoing exemplary embodiments, liquid crystal shutter glasses 103 are used; however, this configuration is not limited. Alternatively, the foregoing exemplary embodiments may be achieved by any other field sequential 3D system. If a system using polarized glasses is employed, for example, a device that modulates a polarization direction of video image to be projected can be driven at a half the frequency. In this case, the polarized glasses and the device that modulates a polarization direction configure a shutter device. If a wavelength division system using wavelength selection glasses is employed, a device that switches between multi-layer filters can be driven at a half the frequency. In this case, the wavelength selection glasses and the device that switches multi-layer filters configure a shutter device.

In the foregoing second exemplary embodiment, controller 70 switches between the control over which video image is projected at the upper left and lower right locations and the control over which video image is projected at the upper right and lower left locations every time the normal mode is switched to the 3D video display mode. However, the switching timing is not limited. Controller 70 may measure an operational time in 3D video display mode and switch between both the controls every time a preset time comes. Alternatively, controller 70 may switch between both the controls every time projection video display 100 is powered up. Moreover, controller 70 may employ the combination of a plurality of parameters.

For example, suppose when an operational time in the 3D video display mode measured by controller 70 reaches a preset time, projection video display 100 switches from the normal mode to the 3D video display mode. In response to this, controller 70 may switch between the control over which video image is projected at the upper left and lower right locations and the control over which video image is projected at the upper right and lower left locations. After an operational time in the 3D video display mode measured by controller 70 has reached a preset time, controller 70 may switch between both the controls when projection video display 100 is powered next time.

In the foregoing second exemplary embodiment, when controller 70 switches between the control over which video image is projected at the upper left and lower right locations and the control over which video image is projected at the upper right and lower left locations, video signal generator 74 generates subframes from different pixels. However, this configuration is not limited.

Alternatively, when controller 70 switches between the control over which video image is projected at the upper left and lower right locations and the control over which video image is projected at the upper right and lower left locations, video signal generator 74 may generate subframes from the same pixels and may change a displayed location on a display element. For example, when controller 70 performs the control over which video image is projected at the upper left and lower right locations, video signal generator 74 may generate first subframe video from upper left pixels and second subframe video from lower right pixels. After controller 70 has switched this control to the control over which video image is projected at the upper right and lower left locations, video signal generator 74 may still generate first subframe video from upper left pixels and second subframe video from lower right pixels. Then, optical path changer 80 shifts a location at which the video of the second subframe is displayed on a display element, leftward by one pixel length while maintaining the location at which the video of the first subframe is displayed on the display element. In this way, the relationship of a displayed location on a screen between subframes is maintained.

The foregoing exemplary embodiments are examples of the technique of the present disclosure; therefore, the exemplary embodiments can undergo various modifications, substitutions, additions, and omissions without the scopes of the claims and their equivalents.

The present disclosure is applicable to projection video displays that have a 3D video display function and employ a pixel shift technique to project high-density video.

What is claimed is:

1. A projection video display comprising:
   a video generator that generates video image;
   an optical system that projects the video image onto a projection surface;
   an optical path changer that changes a location at which the video image is displayed on the projection surface, the optical path changer being disposed in an optical path of the video image; and
   a controller that controls the video generator and the optical path changer, based on a video input signal,
   wherein the controller generates a left-eye video signal and a right-eye video signal, which are viewpoint images for three-dimensional (3D) video, from the video input signal,
   the controller spatially splits an image indicated by signals of frames in each of the left-eye video signal and the right-eye video signal to generate signals indicating a plurality of types of subframes, each of the plurality of types of subframes is formed of images displayed on different pixel position in the split image,
   the controller controls the optical path changer so as to maintain the location at which the video image is displayed on the projection surface before and after a time when a subframe in the left-eye video signal and a subframe in the right-eye video signal are switched, and
   the controller controls the video generator such that, when a first frame is switched to a second frame, the type of a last subframe in the first frame and the type of a first subframe in the second frame are the same and are related to different viewpoint images.

2. The projection video display according to claim 1, further comprising:
   a shutter device that switches between a light transmitting state and a light shielding state, transmits the light of video image that reaches to a left eye or a right eye in the light transmitting state, and shields the light of video image in the light shielding state; and
   an actuator that operates the optical path changer,
   wherein a switching frequency of the shutter device is set to be the same as a driving frequency of the actuator, and
   a phase difference between a switching waveform of the shutter device and a drive waveform of the actuator is set to 90 degrees.

3. The projection video display according to claim 2, wherein
   when a 3D video display mode in which 3D video containing videos for a plurality of viewpoints is displayed is switched to a normal mode in which video for a single viewpoint is displayed, a drive frequency of the actuator in the 3D video display mode is set to be the same as a drive frequency of the actuator in the normal mode.

4. The projection video display according to claim 1, wherein
   the video generator generates a signal indicating at least one type of a subframe through an interpolation process, which is a process for making interpolation based on two successive frames.

5. The projection video display according to claim 4, wherein
   the controller varies weights added to the two frames related to the interpolation process in accordance with display timings of the plurality of types of subframes, and
   the video generator makes interpolation of weighting based on the weights in the interpolation process.

6. The projection video display according to claim 1, wherein
   the video generator generates a plurality of a same type of subframes for a single frame in each of the left-eye video signal and the right-eye video signal.

7. The projection video display according to claim 1, wherein
   the video input signal includes a first left-eye video signal, a second left-eye video signal, a first right-eye video signal, and a second right-eye video signal,
   the video generator generates a subframe, which is a viewpoint image for a left eye and whose type is a first type, based on the first left-eye video signal,
   the video generator generates a subframe, which is a viewpoint image for a left eye and whose type is a second type, based on the second left-eye video signal,
   the video generator generates a subframe, which is a viewpoint image for a right eye and whose type is a first type, based on the first right-eye video signal, and
   the video generator generates a subframe, which is a viewpoint image for a right eye and whose type is a second type, based on the second right-eye video signal.

8. The projection video display according to claim 1, wherein
   the optical path changer moves a part of the optical system in a direction crossing the optical path.

9. The projection video display according to claim 1, wherein:
   the image comprises a plurality of blocks including a plurality of pixels, and each of the plurality of types of subframes is formed by a plurality of pixels located at relatively same position in each of the plurality of blocks.

10. The projection video display according to claim 9, wherein each of the plurality of blocks is formed by the plurality of pixels arranged in a two-dimensional matrix.

* * * * *